United States Patent [19]

Gillmore et al.

[11] Patent Number: 5,063,072

[45] Date of Patent: Nov. 5, 1991

[54] ONE-STEP FLAVORED PASTA PRODUCTS AND PROCESSES FOR PREPARING FAST COOKING PASTA PRODUCTS

[75] Inventors: Stephen R. Gillmore, Cato; Carleton G. Merritt, Phoenix; Dhyaneshwar B. Chawan; Edward A. Matuszak, both of Liverpool, all of N.Y.

[73] Assignee: Borden, Inc., Columbus, Ohio

[21] Appl. No.: 485,893

[22] Filed: Feb. 28, 1990

Related U.S. Application Data

[63] Continuation-in-part of Ser. No. 225,211, Jul. 28, 1988, abandoned, and Ser. No. 149,589, Jan. 28, 1988, abandoned, which is a continuation-in-part of Ser. No. 105,704, Oct. 8, 1987, abandoned.

[51] Int. Cl.$^5$ ................................................ A23L 1/00
[52] U.S. Cl. ................................. 426/557; 426/113; 426/242; 426/243; 426/311; 426/451
[58] Field of Search ............... 426/557, 451, 242, 243, 426/311, 113

[56] References Cited

U.S. PATENT DOCUMENTS 4,346,119  8/1982  Braibanti ........................ 426/451

*Primary Examiner*—Donald E. Czaja
*Assistant Examiner*—Mary S. Mims
*Attorney, Agent, or Firm*—Venable, Baetjer, Howard & Civiletti

[57] ABSTRACT

It has been discovered that dried extruded pasta shapes prepared in certain ways display a high toleration for exposure to water at temperatures of less than boiling. This toleration is conveniently evaluated by cooking in a microwave oven and then extracting with room temperature water to determine if the starch loss is less than 7.0 weight percent. This toleration is obtained by exposing the extruded pasta shapes to temperatures of about 180° F. or greater, temperatures of about 165° F. or greater if the pasta contains a low temperature coagulatable protein such as egg whites or simple room temperature aging if the pasta contains both a low temperature coagulatable protein and a sulfhydryl reducing agent such as l-cysteine hydrochloride. This toleration makes the pasta amenable to a number of cooking procedures such as presoaking in cold water prior to cooling (thus dramatically reducing the cooking time), and cooking in a microwave oven. It also makes the pasta amenable to cooking in just the amount of water which it will absorb in becoming cooked, thus providing an incentive for including lipid based flavoring agents in the pasta.

77 Claims, No Drawings

ONE-STEP FLAVORED PASTA PRODUCTS AND PROCESSES FOR PREPARING FAST COOKING PASTA PRODUCTS

CROSS REFERENCE TO RELATED APPLICATION

This application is a continuation-in-part of Ser. No. 149,589, filed Jan. 28, 1988 (now abandoned) which is a continuation-in-part of Ser. No. 105,704, filed Oct. 8, 1987 (now abandoned). This application is also a continuation-in-part of Serial No. 225,211, filed July 28, 1988, (now abandoned).

FIELD OF INVENTION

This invention is directed to a process for preparing a pasta product which is capable of cooking in less than about two minutes. Specifically, the invention pertains to preparation of a pasta product which is tolerant to exposure to non-boiling water. More specifically, this invention deals with a process for making pasta that can withstand soaking in cold water without disintegrating, lumping or leaching starch into the soak water.

The invention is also directed to pasta products which can be cooked in, for example, a microwave oven in one-step. The pasta products of this invention can be so prepared without the need for the addition of a flavoring agent. Instead, the flavoring agent is part of the pasta formulation and is retained in the pasta subsequent to cooking.

BACKGROUND OF THE INVENTION

Pasta consumption is enjoying a rise in popularity for reasons of health, nutrition, convenience and economy. Home consumers and restauranteurs are therefore in need of a pasta product which is prepared in a very short amount of time without loss of palatability or flavor. Commercially available dry pasta takes 9 to 12 minutes to cook for optimal tenderness. Once cooked, the pasta tends to become sticky and lose a desirable mouth-feel upon standing for any period of time.

Typically, restaurants cook a large batch of pasta in advance and portion it out for single servings, to eliminate the 9- to 12-minute lag time in preparing a customer's meal. The single servings are then kept in a refrigerator, and when needed, each portion is dipped momentarily in boiling water using a colander-type utensil to heat and then drain it and then it is put onto a serving dish. While fast, pasta made in this manner lacks the taste and texture qualities of freshly-cooked pasta.

It is highly desirable to have a pasta product which may be cooked rapidly after exposure to non-boiling water. It is known in the art to prepare microwave cooked pasta. For example, Golden Grain Macaroni Company markets a product which is cookable in warm water. The package directions require placing pasta in warm water; microwaving to boiling; continued boiling for three minutes to absorb water; and flavoring with a cheese sauce. However, the boiled pasta suffers great starch loss and is only palatable when sauce is added to the boiled product to mask its gumminess and starchiness.

Prior art pasta products have additional deficiencies. For example, in the past, a good flavored pasta meal required the addition of a flavor to the cooking water during preparation of the pasta or the addition of a flavoring agent to the pasta after it had been cooked and drained. The addition of a flavoring agent to the cooking water results in a pasta product with a starchy, gummy texture which is highly undesirable. The addition of a flavoring agent or sauce after the pasta has been cooked and drained is just an added, time-consuming step that could be eliminated if a flavoring agent could be incorporated into the pasta dough.

The incorporation of a flavoring agent into pasta dough has been unsuccessfully attempted, as evidenced by Hummel, *Macaroni Products Manufacture, Processing and Packaging,* Food Trade Press, Ltd., p. 12 (1966). Common flavoring agents are usually fat- or lipid-based, and therefore difficult to incorporate into pasta dough. The lipid-based flavoring agents cause the pasta dough to become discontinuous and break down.

As discussed above, various attempts have also been made to manufacture a pasta product which is susceptible to microwave cooking. U.S. Pat. No. 4,208,439 to Hsu describes an instant pasta product which can be prepared in a micro-wave oven. The Hsu pasta product is capable of microwave preparation because it is formed from a sheet of pregelatinized or precooked cereal flour dough.

A precooked, vacuum-dried alimentary paste is also used to make the casserole composition disclosed by Lawrence et al. in U.S. Pat. No. 3,484,251. The Lawrence casserole composition is capable of preparation in a single cooking operation (although microwave cooking is not specifically disclosed). An alimentary paste tenderizer is used and selected from the group consisting of cysteine, water-soluble cysteine salts and cysteine hydrochloride.

U.S. Pat. No. 3,762,931 to Craig et al. also discloses the use of edible sulfhydryl reducing substances such as cysteine, glutathione and sulfites in alimentary pastes. Craig et al. refer to those sulfhydryl reducing substances as paste-modifying ingredients and claim that mixing and extrusion of the paste is more easily accomplished because less process water is necessary.

The present invention concerns techniques for rapid cooking of a pasta which involves toleration for an initial exposure to room temperature or colder water. The pasta product is pretreated in such a way as to stabilize it against starch leaching in cold water.

One process embodiment of this invention is performed by the steps of (a) soaking uncooked pasta in water having a temperature of between about 33° F. (0.6° C.) and about 140° F. (60° C.) for a period of time sufficient to hydrate the pasta; and (b) cooking soaked pasta resulting from the preceding step by heating for a period of time shorter than would be needed to cook pasta which had not been previously soaked. Starch loss from cooked pasta which results is less than about 7.0% by weight of the uncooked pasta.

In preferred process embodiments, the heating step may be accomplished either by microwave heating, or by immersion in hot or boiling water.

In other preferred embodiments, the pasta is packaged in individual portions, i.e., in water-permeable boiling water-resistant containers such as perforated plastic bags.

In an especially preferred embodiment, the invention relates to a process for preparing a fast-cooking pasta product comprising the steps of (a) soaking a portion of uncooked pasta in a perforated polyethylene bag, in water having a temperature between about 40° F. (4.4° C.) and about 50° F. (10° C.) for a period sufficient to hydrate the pasta, i.e., of between about 4 and about 12 hours, and (b) either subjecting soaked pasta to microwave heating or immersing soaked pasta in hot or boiling water for between about 1 and about 2 minutes to cook the pasta. The pasta preferably comprises semolina flour, water, optional glycerol monostearate, optional low temperature coagulatable protein, and optional sulfhydryl reducing agent. The process of the invention may be accomplished by selecting a pasta which, prior to the soaking step, was subjected to temperatures of at least about 180° F. (82.2° C.). Starch loss from cooked pasta which results is less than about 7.0% by weight of the uncooked pasta.

In another preferred embodiment, the invention relates to a process for preparing a fast-cooking pasta product, wherein the process comprises the steps of (a) soaking a portion of uncooked pasta in water having a temperature of between about 33° F. (0.6° C.) and about 140° F. (60° C.) for a period of time sufficient to hydrate the pasta, which pasta comprises semolina flour, water, low temperature coagulatable protein, an optional sulfhydryl reducing agent, and optional glycerol monostearate; and (b) either subjecting soaked pasta to boiling water or microwave heating to cook the pasta. Prior to soaking, the uncooked pasta is subjected to temperatures of at least about 165° F. (73.9° C.), as by drying. Starch loss from cooked pastas which result is less than about 7.0% by weight of the uncooked pasta.

In yet another preferred embodiment, the invention relates to a process for preparing a fast-cooking pasta product, wherein the process comprises the steps of (a) soaking a portion of uncooked pasta in water having a temperature of between about 33° F. (0.6° C.) and about 140° F. (60° C.) for a period of time sufficient to hydrate the pasta, which pasta comprises semolina flour, water, low temperature coagulatable protein, sulfhydryl reducing agent, and optional glycerol monostearate; and (b) either subjecting the soaked pasta to boiling water or microwave heating to cook the pasta. Prior to the soaking step, the pasta was aged for from about 3 to about 12 months. Again, starch loss is less than about 7.0%.

In still another embodiment, the invention relates to a shelf stable, microwave cookable, prepackaged pasta product containing uncooked pasta and sauce capable of preparation to a consumable, servable state by addition thereto of water, and cooking in a microwave oven.

The invention also relates to a pasta product comprising between about 70% and about 85% by weight wheat flour, between about 8% and about 23% by weight added moisture, between about 0.50% and about 2.50%, by weight, of a low temperature coagulatable protein, and a sufficient amount of a flavoring agent to cause the pasta product to retain the flavor after cooking.

The pasta product is neither precooked nor pregelatinized, and yet is capable of one-step preparation in a microwave oven. The flavoring agents may be lipid-based. Even when lipid-based flavoring agents are utilized, the pasta dough remains continuous and does not break down.

High temperature drying techniques, as referred to above, are the preferred method used to dry the pasta product, and such techniques result in a reduced loss of solids during the cooking of the pasta product.

The invention also relates to a snack food product which is made from the pasta dough as described above. The pasta dough is fried for a sufficient time so that the snack food product has a texture and consistency much like that of a potato chip.

DETAILED DESCRIPTION OF THE INVENTION

This invention pertains to processes for the more convenient cooking of pasta. The invention provides pasta which has a good tolerance to exposure to room temperature or cooler water. The processes of the invention involve the pretreatment of the pasta to develop such tolerance and the subsequent preparation either by presoaking in cool water and cooking or by simply cooking by microwave irradiation.

In one embodiment, the process comprises the steps of soaking uncooked pasta in water for a period of time sufficient to hydrate the pasta and subsequently heating the soaked pasta for a period of only about 1 to about 2 minutes to cook the pasta.

Conventional pasta cooking is a fairly time-consuming process, taking at least about fifteen minutes. Before the pasta encounters water in which it is to be cooked, the water must be at or near the boiling point in order to set gluten in the pasta and prevent leaching of the starch into the water. The subsequent cooking stage requires about 9 to 12 minutes.

It is a surprising advantage of the present invention that it is possible to treat uncooked pasta with room temperature or colder water to hydrate the pasta, and subsequently cook the resulting hydrated pasta for a short period of time without appreciable loss of starch into the water. Surprisingly, the starch loss is less than about 7.0% based on the weight of uncooked pasta.

It has surprisingly been found that, when pasta, which inherently contains protein in the form of gluten, is subjected to a temperature of at least about 165° F. (73.9° C.) dry bulb, the protein component which surrounds the starch granules, and which is water soluble in its native form, at least partially denatures, resulting in its effectively encapsulating the starch granules by forming a water insoluble protein matrix in which the starch is entrapped. This matrix renders the pasta stable to starch leaching, even in the presence of cold water. Conventional pasta that has not been subjected to this high temperature denaturation, which may be of short duration, must immediately contact extremely hot water in order to set the protein matrix; otherwise, the starch will rapidly leach out into the cooking water, resulting in a mushy, gummy, unsatisfactory product. The result in the present invention is a storage-stable, still uncooked pasta which has the unique advantage of being able to withstand exposure to cold water without leaching starch into the water. This confers the unique property onto the pasta that it may be hydrated without cooking, so that it may undergo the lengthiest portion of its preparation prior to its actual exposure to heat. Thus, the actual cooking process may be accomplished in only one to two minutes. Alternatively, the pasta may be subjected to room temperature water and immediately heated by microwave irradiation, as will be discussed infra.

Uncooked pasta may be prepared from any formulation known in the art. By "uncooked" is meant pasta wherein a major portion, i.e., greater than about 80% by weight of the total starch content, is ungelatinized. The term "cooking" as used herein refers to the process of gelatinizing the starch and heating the pasta.

Pasta is prepared from an "alimentary paste" or dough by which is meant a glutinous flour and water mixture. Alimentary pastes or doughs are generally made from coarse, hard flours obtained from hard wheat such as the middlings of durum wheat, often referred to as "semolina flour" or "semolina". In addition, fine flours such as durum flour, wherein 98 weight percent passes through a 70 mesh sieve, are also suitable and are intended to fall within the scope of the term "glutinous flour". The only requirement for the flour is that it provide a self-supporting paste upon mixture with an appropriate amount of water. Semolina typically comprises a major portion of the flour in alimentary pastes because it is highly glutinous, i.e., has a high content of the protein gluten which is capable of denaturing to provide a self-supporting pasta. The denaturation of gluten will be discussed in further detail, infra.

A typical alimentary paste used to prepare pastas suitable for the present invention comprises, based on the weight of uncooked pasta, between about 67.0% and about 80.0% by weight (solids basis) of semolina flour (having an inherent moisture content of between about 10% and about 15% and preferably between about 11% and about 14% by weight, and a gluten content of between about 11% and about 14% by weight), the balance being optional additives and added water.

Several additives may be added to the flour/water alimentary pastes suitable for use in the present invention. Some suitable additives include glycerol monostearate (GMS); an added low temperature coagulatable protein material; and a sulfhydryl reducing agent.

The first additive is a commercially available glycerol monostearate (GMS) or other monoglyceride. When optionally used, GMS improves the texture and "bite" of the resulting alimentary paste, and also reduces the pressure necessary to extrude the paste. When used, GMS comprises between about 0.5% and about 2.0% by weight of the alimentary paste, and preferably between about 1.0% and about 1.5% by weight of the paste.

The second additive is an added low temperature coagulatable protein material, distinct from the gluten component inherent in the glutinous flour. These protein materials are ones which coagulate (i.e., denature) at temperatures less than about the boiling point of water, preferably at from about 140° F. to about 180° F. and most preferably from about 140° F. to about 160° F. The exact temperature at which the protein denatures is dependent on various factors including moisture content; higher moisture contents require lower temperatures to denature the protein material. The added protein may serve to enhance the cold water tolerance and resistance to starch leaching of the pastas of the present invention, rendering resultant pastas somewhat more resistant to starch leaching in cold water. The added proteins include, but are not limited to, albumin, whole egg, egg white, egg yolk, whey protein concentrate, and mixtures thereof. Any of these protein materials may be added dry or as is. A preferred protein material is egg white. When used, the added protein component comprises up to 3.0% by weight of the total paste, preferably between about 0.5% and about 3.0% by weight based on the alimentary paste. As will be seen below, the addition of protein becomes essential only at heat treatment temperatures of less than about 180° F. (82.2° C.).

A third additive is one or more sulfhydryl reducing agents. The presence of the sulfhydryl reducing agent, in addition to permitting the formation of an extrudable dough with less water, is believed to facilitate the irreversible denaturation of the gluten. Sulfhydryl reducing agents which have been found to be useful in the manufacture of pasta products include sodium metabisulfite ($Na_2S_2O_5$), cysteine, water-soluble cysteine salts such as 1-cysteine hydrochloride, glutathione and other sulfite salts. Sulfhydryl reducing agents are compounds which are capable of initiating reactions which reduce —S—S— bonds in gluten to form —SH groups. The sulfhydryl reducing agents may be utilized either singularly or in combination. The percentage of the sulfhydryl reducing agent present in the pasta paste or dough, when used, is between about 0.005% and about 0.2% by weight of the paste, and preferably between about 0.02% and about 0.04% by weight, based on total paste weight. The percentage range remains the same for a combination of sulfhydryl reducing agents. At heating temperatures of about 165° F. (73.9° C.) or lower, addition of a reducing agent becomes essential, as well as the use of an aging step, as will be discussed in further detail below.

Other optional ingredients include added vitamins, typically added to enrich food products, e.g., B-vitamins.

The remainder of the paste comprises water. Water is preferably introduced in the form of ice during extrusion, to prevent swelling of the paste during extrusion. The water, or moisture, content is between about 20.0% and about 30.0% by weight of the paste. As used herein, water or moisture content refers to total moisture of the paste, i.e., the total of inherent moisture, (moisture naturally present in the flour and other ingredients), and added water. The term "water" as used herein includes water in all physical states, i.e., steam, ice or liquid, or mixtures thereof.

The flour, water and any additives used may be mixed in any way conventional in the art, such as by mixing in a vertical cutter mixer (e.g., a Hobart Cutter/Planetary Mixer) for approximately one minute, at which time the pasta dough is ready for extrusion in any of the conventional pasta shapes. Alternatively, the components of the paste may be separately introduced into an extruder without prior mixing. These extruded pasta shapes are then preferably subjected to a drying step, discussed below.

Shaped pasta products may be prepared from the paste either by extrusion or by rolling.

Extrusion can be performed with any acceptable extruder. The alimentary paste is forced through the holes of the extruder die to obtain the desired shape. The holes in the extruder die prescribe the profile of the alimentary paste. The alimentary paste passes through the die due to internal pressures generated by a rotating screw or screws. Vacuum pressure may or may not be used. Skilled workers are well acquainted with various aspects of how extrusion parameters should be adjusted, at least with respect to fully conventional pasta extrusion. Conventional extrusion guidelines may be readily employed, perhaps with fully conventional optimization experiments.

Typical extruder conditions include a barrel temperature of 70° F. to 120° F. (21.1° C. to 48.9° C.); a screw temperature in the same range; vacuum of 26 to 76 cm Hg; head temperature of 100° F. to 140° F. (37.8° C. to 60° C.); and die orifice pressure of 500 psig to 2000 psig. The extruded alimentary paste may be cut to desired lengths to provide a product in substantially final form. Cutting generally occurs at the extruder die and may be carried out in a conventional manner. Cutting is not essential to the practice of this invention, since the alimentary paste may be formed into desired lengths by pulling the extrudate away from the die. All conventional pasta shapes are suitable for use in this invention.

Extruders which have been found acceptable include the DeMaco-S25 extruder, the Mapimpianti GF20 extruder and commercially available extruders marketed by Brabender, Buhler or Braibanti. For optimal extrusion, the barrel temperature of the extruder should be approximately 120° F. (48.9° C.), and the extruder should have 10 to 25 inches of mercury vacuum, a power Capacity of 5 to 10 amps, and a die orifice pressure of 1800 to 2700 psi.

A suitable extrusion process is a so-called low moisture, high temperature process, i.e., one where the final moisture content of the resulting paste is between about 20% and about 28% by weight, based on total moisture in the pasta. Such a process is disclosed in U.S. Ser. No. 39,744, to Ventres et al., filed Apr. 20, 1987, assigned to the assignee of the present invention. That application is hereby incorporated by reference herein.

While particularly close control of the moisture content is not essential, it is desirable to keep the moisture content at the start of processing within a range of between about 16% and about 28% by weight. A particularly preferred moisture content is less than or equal to about 26% by weight. A moisture content above about 16% is desirable because protein denaturation is facilitated at such levels, and because the temperature necessary to denature the gluten is higher with lower moisture contents. However, if the moisture content is above about 30%, starch gelatinization begins to occur.

The extruded pasta product may be in any of the conventional pasta shapes, such as spaghetti, linguini, rotini, elbows, spirals, shells, conchiglioni, ziti, vermicelli, fusilli, fettucine, tortellini, ravioli, manicotti, lasagna, rote or tortiglioni.

Alternatively, a non-extruded pasta product, such as fettucine, which is prepared from rolled sheets of alimentary paste, may be utilized in the present process.

Following shaping, conventional pasta is generally subjected to a drying step to lower its moisture content from between about 20% and about 30% by weight down to between about 10% and about 15% and preferably between about 11% and about 14%, based on the weight of the dried pasta. Traditionally, pasta is dried at a temperature of about 110° F. (43.3° C.) dry bulb, and 100° F. (37.8° C.) wet bulb for about 14 to about 36 hours.

Modern drying techniques, termed "tres haute temperature (THT)" drying, however, require about 120 to 360 minutes, and typically involve a two-step treatment, i.e., a first step involving drying at about 160° F. (71.1° C.) to about 220° F. (104.4° C.) dry bulb, and about 145° F. (62.8° C.) to about 175° F. (79.4° C.) wet bulb for about 120 to about 240 minutes, followed by an optional longer, cooler drying at about 90° F. (32.2° C.) to about 160° F. (71.1° C.), dry bulb and about 98° F. (36.7° C.) wet bulb for from about up to about 120 minutes. A particularly preferred variation involves the use of an air velocity of about 150 cft/min. This in turn allows a significantly shorter drying time of as few as 75 minutes, i.e., a first step of about 15 to 30 minutes and a second step of about 30 to 120 minutes. Following drying, the moisture content is between about 10% and about 11%.

A suitable dryer is disclosed in U.S. Pat. No. 4,699,048 to Pavan, herein incorporated by reference. Other suitable dryers include Standard Industries' batch dryer and Stein's continuous dryer. It has only now been discovered that exposure of the shaped pasta to high temperatures in a manner described in more detail below, i.e, at a temperatures of at least about 180° F. (82.2° C.) even for relatively short periods of time results in a raw pasta product that is uniquely capable of exposure to cold water, without starch leaching out into the water or experiencing lumping or disintegration, such that the pasta can become hydrated without cooking, allowing cooking to be accomplished in a period of time as brief as one to two minutes.

This high temperature treatment of the uncooked pasta may be accomplished in any of a number of ways, including treatment in a dryer (e.g., a hot air, humidity controlled circulating oven), microwave oven, heated drum, infrared tunnel, dielectric heater, or by contact with superheated steam. The high temperature treatment may be part of the drying cycle but need not be; high temperature combined with very high humidity, for example, would not substantially dry the pasta but would at least partially denature the protein nonetheless. Two preferred sources of the requisite high temperature include a dryer or a microwave oven.

As discussed above, one suitable means of conducting the high temperature treatment includes high temperature drying which involves an initial step of heating the pasta to from about 160° F. (71.1° C.) to about 220° F. (104.4° C.) for a period of at least 15 minutes, and then finishing the drying at a temperature of from approximately 90° F. (32.2° C.) to about 160° F. (71.1° C.), for at least an additional 30 minutes to two hours. If the initial heat treatment does not attain at least 165° F. (73.9° C.), sufficient protein denaturation will not occur; if the temperature goes significantly above 220° F. (104.4° C.), vitamins and the essential amino acid lysine present in the pasta may be destroyed, and a brown coloration may result. Additionally, at temperatures above 212° F. (100° C.) water will boil out of the pasta, which may result in cracking and a resultant weakened structure.

If the high temperature treatment is at least about 180° F. (82.2° C.), a pasta capable of preparation in accordance with the present invention may be prepared from semolina and water without the necessity for any of the aforedescribed additives. However, if the drying temperature is in excess of about 165° F. (73.9° C.) and below about 180° F. (73.9° C.) protein denaturation should be facilitated by the addition of a low temperature coagulatable protein such as egg whites. When protein is added in this embodiment, it should be present in the aforedescribed range, i.e., between about 0.5% and about 3.0% of the paste from which the pasta is prepared.

While the drying process requires that the pasta encounter the higher temperature range for at least 15 minutes, it has been found that, for the purpose of setting the protein matrix, the pasta need only encounter these high temperatures for a period of about five minutes or less.

The high temperature drying treatment is a preferred treatment inasmuch as it not only sets the protein matrix but assists in the needed drying step, and also, relative to conventional drying, enhances the retention of the pasta's natural golden color, retention of at least 50% of vitamins added to the uncooked pasta, prevention of browning by the Maillard reaction, and improvement in the texture of the pasta once cooked. Additionally, at the initial high temperature, pasteurization and denaturation of discoloring enzymes such as lipoxidase, polyphenol-oxidase and beta-amylase occurs, thus increasing the shelf life of pasta products so produced. Furthermore, pasta dried in this manner, when cooked, remains non-sticky for a period of time longer than conventionally-prepared pasta.

One deficiency of this method is that, if dried too quickly, rapid evaporation occurs and cracking results. This difficulty may be abated by drying the pasta in a high humidity (i.e., above about 80%) environment.

Another preferred means of high temperature treatment is microwave heating. This mode of heating is advantageous inasmuch as it is very fast and efficient, results in lesser water loss, and therefore reduces the problem of cracking.

However, any of the heating means discussed above, so long as it results in a temperature in the required range, may be successfully employed.

In an alternative, though less preferred embodiment, an uncooked pasta, capable of being soaked in cold water and being subsequently cooked for between about 1 and about 2 minutes, may be prepared in the absence of a heating step of about 165° F. (73.9° C.) or more. In this embodiment, a sulfhydryl reducing agent (e.g., cysteine), in addition to a low temperature coagulatable protein, should be added to the alimentary paste from which the pasta is made, and subsequent to extrusion into shaped pasta and drying, e.g., at less than 165° F. (73.9° C.), or less, the pasta should be aged, i.e., for from about 3 to about 12 months. While not desiring to be bound to any particular theory, it is believed that the aging process allows the gluten in the pasta to spontaneously denature, and the reducing agent sets the denatured protein in a stable configuration capable of binding starch granules. This method is a less preferable means of attaining a cold-soakable pasta because of its lengthy time requirement.

Once the pasta has been subjected to the above steps, it may be packaged by any means known in the art. A particularly preferred mode of packaging is to package the uncooked pasta into individual portion bags, i.e., of about 3 to about 4 ounces (about 85.2 to about 113.6 grams) each, such that numerous portion bags may be cold water-soaked, e.g., overnight, and the soaked portion bags removed on an as-needed basis to boiling water for cooking and single-serving service. For example, the portions may be packaged in a water permeable perforated plastic bag or mesh bag of a water-impervious plastic material such as polyethylene or polyamide. A particularly preferred bag is of VisQueen®, from Ethyl Corporation (a water impervious polyethylene fabric having a nominal thickness of 1 mil and comprising a multitude of tapered holes having hexagonal base configurations).

In another embodiment, a perforated container in the form of a colander may be used to scoop-out and cook an individual portion of soaked pasta.

In still another embodiment, the pasta may be packaged in a microwave-safe, e.g., cardboard, container in combination with a dehydrated sauce. This embodiment will be discussed hereinbelow.

Cooking Processes of the Invention

The pasta products prepared in accordance with the above discussion may now be subjected to the processes of the present invention which require toleration exposure to cool water. One such process involves a cold soaking step and a brief cooking step. The pasta which results is characterized by a starch loss after the soaking and cooking steps of less than about 7.0% by weight, based on the weight of the uncooked pasta.

The first step of the process involves soaking the so-treated uncooked pasta in cold water, i.e., water at a temperature between about 33° F. (0.6° C.) and about 140° F. (60° C.) for a period of time sufficient to hydrate the pasta. By "hydrated" is meant that the pasta has absorbed water to the point that no hard centers remain in the pasta. Alternatively, water-based cooking fluids such as milk or broth may be employed in lieu of water. Preferably, the cold water is between about 40° F. (4.4° C.) and about 75° F. (23.9° C.) and more preferably between about 40° F. (4.4° C.) and about 50° F. (10° C.). In any event, the water is significantly below its boiling point of 212° F. (100° C). Soaking is carried out for whatever length of time is necessary to hydrate the pasta; this may be accomplished in as few as 4 hours, i.e., 4 to 12 hours, but may conveniently be carried out overnight. Preferably, the soaking step is performed under refrigeration conditions to prevent microbial growth. The soaking may be performed on individual portions such as with the perforated bag embodiment, or on a large batch from which individual portions may be removed, such as by scooping-out a predetermined portion size and removing it to a cooking vessel.

Once the pasta has been soaked for the requisite period of time, it may be subjected to heat to cook it. Cooking may be accomplished in a number of ways, such as via a heat source selected from boiling water, steam, superheated steam, hot air, dielectric heat, microwave radiation, ultrasonic energy and radiant heat. Following cooking, the pasta experiences a starch loss of less than about 7.0%, and preferably less than about 3.0%, by weight based on uncooked pasta weight. "Starch loss" is defined as the amount of starch present in the water in which the pasta has been cooked.

Preferred methods of heating are immersion in boiling water and via microwave heating. Heating by microwave irradiation has the unique advantage provided by pastas of this invention of eliminating the need for draining the pasta after cooking, which not only offers convenience but also reduces the loss of water-soluble vitamins and other nutrients.

The cooking time in the present invention is characterized as being shorter than would be needed to completely cook pasta which had not been soaked in cool water. Generally, the cooking time in the present invention is in the range of about 1 to about 2 minutes. Generally, longer shapes of pasta (such as spaghetti) require up to 2 minutes cooking time, whereas shorter varieties (such as elbow macaroni) require only 1 minute to cook. In contrast, conventionally prepared pasta which has not been pre-soaked requires at least 7 minutes cooking time in boiling water.

A particularly preferred way to employ the present invention, suitable for use in fast-food commercial operations as well as in the home, is to soak single-serving portion bags of the pasta in a cold water-filled vessel overnight. When ready to consume, a so-treated bag is dropped into boiling water for the required time period (with swirling, in the case of spaghetti or other long cut products). When cooked, the bag is removed, cut open and the cooked pasta poured onto a serving plate for consumption.

Another suitable way to employ the present invention is to cold-soak a large batch of pasta, and when cooking is desired, to remove an individual portion into a perforated colander, and to cook that portion in the colander.

In another embodiment, the invention pertains to a shelf stable, microwave cookable prepackaged pasta product. It has also been found that, as the pasta is tolerant to exposure to soaking in cold water, it is capable of being exposed to room temperature or colder water for at least the period of time necessary to boil water in which the pasta is to be cooked in a microwave oven, again with a starch loss of less than 7.0% by weight. The package contains uncooked pasta and a sauce. The pasta may be packaged dry in a conventional container or sealed in vapor barrier pouches which are disclosed in U.S. application Ser. No. 195,803, filed May 19, 1988, herein incorporated by reference.

The sauce may be a dehydrated one which is either a natural or artificial flavoring and which may contain the flavor of cheese, cream, butter, tomato sauce, or any other desired flavoring, and which is hydratable by addition of small amounts of water. Alternatively, a water-based liquid such as milk or broth may be used. The sauce may be packaged separately from the pasta for separate cooking or may be premixed with the pasta. By judicious choice of the volume of liquid added, no draining is required after cooking.

The pasta may be any of the varieties discussed hereinabove, i.e., spaghetti, linguini, rotini, elbows, spirals, shells, conchiglioni, ziti, vermicelli, fusilli, fettucine, tortellini, ravioli, manicotti, lasagna, rote or tortiglioni.

The pasta product is packaged in any packaging which is shelf stable and microwave safe and penetrable. Such packaging includes paper (e.g. cardboard), glass or plastic. The packaging may comprise individual portions (e.g., of 3 to 4 ounces each) or bulk portions (e.g., of 5 to 10 pounds) for institutional use. By shelf stable is meant that the packaging protects its contents from degradation under non-refrigerated conditions (i.e., above 40° F. (4.4° C.)) for a time period of up to about 36 months' time.

The microwave cookable prepackaged product may be prepared by adding non-boiling water or other liquid, e.g., tap water, to either each of the separate packages for the sauce and pasta or, preferably, directly to the package itself containing a mixture of the two. The amount of added water should be sufficient to hydrate the pasta and dry sauce mix but preferably small enough that, after cooking, all of the liquid is absorbed into the product so that draining of excess water is not necessary.

According to this embodiment, the added water should maintain in contact with the product for at least about 10 seconds, and then the mixture subjected to microwave heating for a period of time sufficient to completely cook the product (i.e., for between about 6 and about 10 minutes). The resulting pasta exhibits a starch loss of less than about 7.0%, and preferably less than about 3.0% by weight based on the uncooked pasta. (If the pasta is maintained in contact with cold water for a period of time sufficient to fully hydrate it, microwave cooking may be accomplished in one to two minutes.) After cooking in a microwave oven, the pasta product is in a consumable, servable stage.

In the embodiment where the sauce and pasta are packaged separately, the packages are then mixed, and the product is then servable and consumable without additional preparation such as draining. In this manner, a no-drain casserole such as macaroni and cheese is easily prepared by adding water or a water-containing liquid to the microwavable pasta along with optional flavorants such as butter, cheese sauce, etc. The mixture is exposed to heating via microwave radiation with occasional stirring until cooked.

One-Step Flavored Products

Yet another embodiment of the invention relates to a pasta product comprising wheat flour, generally semolina flour, moisture, a protein which is coagulatable at low temperatures as discussed above, and a flavoring agent. Wheat flour is the principal component of most traditional pasta products. In this invention, wheat flour is defined as the flour made from any wheat grain. Suitable wheat grains include, but are not limited to, durum wheat, hard wheat and soft wheat.

In order to make the pasta product, the wheat flour is mixed with water to form a dough. Included as an ingredient in the dough is a protein which coagulates at low temperatures. The low temperature-coagulatable protein forms a thin layer around the starch granules during extrusion. The layer maintains the integrity of the pasta dough even when lipid-based flavors are included in the dough. The integrity of the pasta product is maintained throughout the processing steps and during cooking. The optional inclusion of a sulfhydryl reducing agent discussed above permits the formation of an extrudable dough with less water than is used in conventional pasta making processes. The wheat flour is the major constituent of the dough and is usually present as between about 70% to about 85% by weight of the dough. More preferably, the wheat flour is present as about 73% to about 81% by weight of the dough.

A conventional pasta dough contains between about 15% and about 23% by weight added moisture and no sulfhydryl reducing agent. In contrast, a pasta dough, according to some embodiments of this invention, which includes a sulfhydryl reducing agent, contains between about 8% and about 23% by weight added moisture. In other preferred embodiments, the percentage of the sulfhydryl reducing agent present in the pasta dough is between about 0.0075% and about 0.0750% by weight of the dough. The percentage range remains the same for a combination of sulfhydryl reducing agents.

The reduced amount of moisture used to form the pasta dough reduces the energy costs associated with the manufacture of a pasta product. The reduced-moisture pasta dough will take less time to dry than a conventional dough, and will save energy costs in this manner. Reduced moisture also results in a decrease of flavor loss during drying of the pasta product. Flavor additives often form azeotropes with water and then evaporate with the water during drying. By reducing the added moisture of the pasta dough there are less azeotropic compounds formed, and therefore less loss of flavor from the pasta dough during drying.

The flavoring agents useful for incorporation in the pasta dough are numerous and include both lipid-based and non-lipid-based flavoring agents. Although non-lipid-based flavoring agents such as spinach and egg have been successfully incorporated into pasta dough in the past, lipid-based flavoring agents have not been successfully incorporated into a pasta dough. Some of the lipid-based flavoring agents which may be incorporated into the pasta dough are cheese paste, beef extract, beef tallow, chicken fat, butter flavor, sour cream and cheese. Each flavoring agent is necessarily present in different amounts and weight percentages than the other flavoring agents in order to produce a pasta product which will meet consumer preferences for optimum flavor characteristics. The examples presented below specify amounts and weight percentages of selected flavoring agents. However, generally, the flavoring agent or agents are present in the pasta dough in an amount sufficient to cause the pasta product to retain the particular flavor after cooking.

Seasonings may also be added to the pasta dough. However, seasonings merely serve to enhance or alter flavors and are not considered to be flavoring agents when used alone.

In one embodiment of the invention, pasta dough is prepared by a series of steps which begins with mixing the low temperature-coagulatable protein with the flavoring agent and the process water. When non-lipid-based flavors are used, a solution is formed, and when lipid-based flavors are used, a uniform emulsion should be formed. Alternatively, both a lipid-based flavor and a non-lipid-based flavor may be used together, and a uniform emulsion should be formed with the process water before addition to the wheat flour. The wheat flour is present in an amount of between about 70% and about 85% by weight of the dough, and the flavoring agent is present in an amount sufficient to cause the pasta product to retain such flavor after cooking. The amounts used may be selected according to which flavor is used as related to consumer preferences. Both non-lipid-based and lipid-based flavoring agents may be used in pasta doughs made with low temperature-coagulatable protein. The amounts of particular flavoring agents that may be used in the pasta dough are set forth with more specificity in the examples below.

The emulsion or solution is then added to the chosen wheat flour and mixed in a vertical cutter mixer for approximately one minute, at which time the pasta dough is ready for extrusion in any of the conventional pasta shapes. These extruded pasta shapes are then preferably subjected to a high temperature drying step at about 180° F. (82.2° C.) dry bulb, and about 165° F. (73.9° C.) wet bulb, and at 72% relative humidity for approximately 75 minutes.

Extrusion can be performed with any acceptable extruder. Extrusion is carried out as discussed above.

Low temperature-coagulatable protein is also used in pasta dough with sulfhydryl reducing agents. The same advantages of flavoring the pasta with lipid-based flavors are found with this type of dough, along with the additional advantage of being able to use a reduced amount of added moisture in the dough. The amounts of wheat flour and flavoring agent are the same as those described above. The low temperature-coagulatable protein is also present in the same percentages as described above for the pasta dough without sulfhydryl reducing agents, namely from about 0.50% to about 2.50% by weight of the pasta dough. Added moisture is present in the dough in reduced percentages of about 8% to about 23% by weight of the pasta dough.

When preparing a pasta dough which contains both low temperature-coagulatable proteins and sulfhydryl reducing agents, the dry constituents (wheat flour and sulfhydryl reducing agents) are commonly dry-mixed separately from the mixture of the low temperature-coagulatable protein, process water and flavoring agent. The dry mixture and the emulsion or solution of low temperature-coagulatable protein, process water and flavor are then mixed to form the dough for extrusion. The extruded pasta products are then preferably subjected to high temperature drying, as previously described. A particular sequence to the mixture of the constituents is not essential to the invention, and the mixture may be performed in any convenient sequence.

A further embodiment of the invention involves the use of sulfhydryl reducing agents in the pasta dough without a low temperature-coagulatable protein. When used without a low temperature-coagulatable protein, the pasta dough containing the sulfhydryl reducing agent also exhibits the ability to retain the flavor of a lipid-based or non-lipid-based flavoring agent even after cooking. This pasta dough also exhibits the advantage of a reduction in the added moisture necessary to form the dough. The reduced added moisture content of the pasta dough is between about 8% and 23% by weight of the pasta dough.

The pasta dough with a sulfhydryl reducing agent but no low temperature-coagulatable protein is generally made by a series of steps which begins with the dry mixing of the sulfhydryl reducing agent or agents and the chosen wheat flour. This mixing generally takes place in a vertical cutter mixer. The mixing may be carried out as a batch process or as a continuous process.

In a separate step, the lipid-based flavoring agent is added to the process water and mixed until a uniform emulsion is obtained. If a non-lipid-based flavoring agent is added to the process water, a uniform solution is formed.

After the uniform emulsion or solution has been formed, it is added to the wheat flour/sulfhydryl reducing agent mixture and further mixed in the vertical cutter mixer for approximately one minute. At that time, the pasta dough is ready for extrusion and preferably high temperature drying, as described above. Also as described above, the sequence of mixture of the constituents is not essential to the invention.

It has been found that the high temperature drying discussed above results in significantly lower solids loss during cooking of a pasta product as compared with low temperature drying. During cooking, a pasta product prepared with low temperature drying has an average solids loss of 6.02% based on the total solids content of the uncooked pasta, whereas the average solids loss during cooking of a high temperature dried pasta product is about 4.37% on the same basis. The average difference in solids loss during cooking of a pasta product prepared with low temperature drying as compared to one prepared with high temperature drying is approximately 1.65%, based on the total solids content of the uncooked pasta product.

Typical high temperature drying of pasta products is conducted at 175° F. (79.4° C.) or higher, and preferably at about 180° F. (82.2° C.) dry bulb, and about 165° F. (73.9° C.) wet bulb, for approximately 75 minutes. In contrast, conventional low temperature drying of pasta products is typically conducted at about 110° F. (43.3° C.) dry bulb, and about 98° F. (36.7° C.) wet bulb for approximately 12 hours. Both high temperature and low temperature drying commonly take place at about 70% relative humidity.

Subsequent to the high temperature drying, the pasta product can be packaged for distribution to consumers. The major advantages of this pasta product to consumers are its flavored state and the fact that it can be prepared in a microwave oven. Both of these properties of the pasta product contribute to its one-step preparation characteristic, which is particularly advantageous to consumers.

The pre-flavored nature of the product eliminates the need to prepare or add a flavoring agent as an additional step in the preparation of the pasta, and the properties of this pasta product prevent the flavoring agent from dispersing into the cooking water which will be drained from the pasta if prepared in a conventional fashion by boiling in water. Preparation in a microwave oven is also time-efficient, because it eliminates the necessity of draining the pasta after cooking. Microwave preparation of the pasta product requires only enough water to swell the pasta to its cooked form and consistency, thereby leaving no excess cooking water to be drained.

All of the above-described embodiments of the flavored pasta product are capable of preparation in a microwave oven. Microwave preparation eliminates the need for draining the pasta after cooking, and the flavored nature of the pasta product eliminates the need to add any sauces or flavorings to the product.

In addition to the pasta products described above, the pasta dough may also be subjected to a frying process in order to prepare a snack food product or a shelf-stable instant noodle. The snack food product and instant noodle are prepared from the pasta dough before it is subjected to a drying step.

To make the snack food product, the undried pasta dough is preferably extruded directly into a suitable frying oil that is maintained at a temperature between about 300° F. (148.9° C.) and about 400° F. (204.4° C.) and is cooked in the hot oil for approximately 40 to 90 seconds. As an alternative to direct extrusion to the hot oil, the extruded pasta dough may be transported or conveyed from the extruder to the frying oil. Suitable fryers include conventional french-fry fryers with perforate baskets and continuous fryers which use perforate belts to move the pasta dough through the hot oil. Suitable oils used to cook the extruded pasta dough are vegetable oils such as corn oil, peanut oil, soybean oil, cottonseed oil and palm oil. The fryer into which the pasta dough is extruded has some means for keeping the dough submerged in the oil for the required times. The most common means are mixing or submersing paddles or a belt or conveyor.

The pasta dough may be extruded into the fryer in any desired snack food shape such as slices, elongated rods, strips, spirals and twists. The thickness of the extruded pasta shape should be between about 0.01 inch and 0.10 inch for optimal textural characteristics after frying. Although extrusion is a preferred method of forming pasta dough shapes, any suitable method of formation would be satisfactory, such as cutting, sheeting, slicing, pressing or molding. After removal from the fryer, oil is allowed to drain from the fried product and the snack food product may then be optionally seasoned with salt in an amount between about 0.5% and about 1.5% by weight.

It has been found that the use of both an added sulfhydryl reducing agent and an added low temperature-coagulatable protein in the pasta dough enhances the textural and flavor characteristics of snack food products made therefrom. Also, a frying time of about 50 to 60 seconds at an oil temperature of about 380° F. (193.3° C.) seems to yield snack food products with optimal textural and flavor characteristics.

The improvement of the present snack food product is derived from the flavored dough used to make the product. Because the dough is flavored, there is no need to perform a separate flavoring step after the frying of the product. The flavored dough also provides a more consistent flavor to the snack food product, because the flavor is dispersed throughout the product rather than just on the surface. The latter is common in the art.

The instant noodle is made in a manner similar to that used for preparation of the snack food product. The undried pasta dough as described above is preferably extruded into a suitable frying oil at a temperature between about 300° F. (148.9° C.) and about 400° F. (204.4° C.). However, to make an instant noodle, the pasta dough is fried until it contains between about 0% by weight to about 10% by weight moisture. The frying time necessary to obtain this moisture content in the product is typically somewhat less than that necessary to make the snack food product. Generally, the frying time necessary to produce the instant noodle product is between about 2 seconds and about 40 seconds.

The same fryers and oils described above as suitable for use in making the snack food product are also suitable for making the shelf-stable instant noodle product. The thickness of the pasta dough used to make the noodle is also in the same range as the thickness of the pasta dough used to make the snack food product, namely about 0.01 inch to about 0.10 inch. As with the snack food product and the pasta dough, the flavor is dispersed throughout the instant noodle.

The features and advantages of the process of the invention are further demonstrated by the following examples. In this specification and in the following examples, all parts and percentages are by weight on an as-is basis, and all temperatures are in degrees Celsius, unless expressly stated to be otherwise.

EXAMPLES

Preparation of High Temperature Dried Pasta Suitable for Use in the Present Invention

EXAMPLE 1

An alimentary paste was made by mixing the following ingredients:

|  | Parts By Weight |
| --- | --- |
| Semolina flour (solids basis) | 67.96 |
| Glycerol monostearate (suspension, solids basis) | 1.00 |
| dried egg whites | 3.00 |
| l-cysteine hydrochloride (400 ppm) | 0.04 |
| total water, (combination of added tap water and moisture in ingredients) | 28.00 |

The glycerol monostearate, cysteine and water sufficient to make the total moisture content 28% were mixed thoroughly in a laboratory mixer. The mixture was added to the semolina flour in a Hobart Cutter mixer in 3 equal portions with one minute mixing after each addition. Dried egg whites were then added and mixed for one additional minute.

The paste so produced was fed into a Mapimpianti-GF20 pasta extruder and forced through a spaghetti die. The extruder was operated at a screw speed of 20 rpm; screw temperature of 100° F. (37.8° C.); barrel temperature of 100° F. (37.8° C.); head temperature of 120° F. (48.9° C.); and die pressure of 1500 psig. Desired lengths were cut with a cutoff knife. Cut pieces of 6 to 8" length of spaghetti were nested on a drying tray.

Drying trays containing the nested spaghetti were dried using a Standard Industries' 50-pound batch dryer. The spaghetti was dried at 180° F. (82.2° C.) at 80% relative humidity for 120 minutes and then at 110° F. (43.3° C.) at 70% relative humidity for 480 minutes.

EXAMPLE 2

An alimentary paste was made which was identical to the one used in Example 1. The ingredients were mixed and extruded according to the process of Example 1, except that, instead of spaghetti, rotini was made using the appropriate die on the extruder. In this Example, the extruder had a barrel temperature of 96° F. (35.6° C.); screw temperature of 96° F. (35.6° C.); head temperature at the die of 120° F. (48.9° C.); and die pressure of 2000 psig. One- to one-and-one-half-inch lengths of rotini were cut with an automatic cutoff knife and collected in a drying tray.

Trays of the rotini were loaded into the 50-pound Standard Industries' batch dryer and dried at 165° F. (73.9° C.) at 70% relative humidity for 120 minutes, then at 120° F. (48.9° C.) also at 70% relative humidity for 6 hours.

Starch Losses of Pasta Prepared by Microwave Cooking According to the Present Invention

EXAMPLES 3-8

Elbow macaroni was prepared according to the following high temperature drying process and evaluated for starch loss as follows.

A paste from semolina flour having either 24% or 30% total moisture (as specified in Table 1 below) was mixed, where specified with sodium bisulfite reducing agent at a level of 200 ppm. Moisture was incorporated into the mixture in the form of ice cubes (1 cm$^2$) using a high speed Hobart Cutter mixer. Dough (paste) was extruded using a Mapimpianti GF 20 extruder at either 24% or 30% extrusion moisture level. Small elbows were made using a die with teflon inserts.

The extruded elbows were dried in a 50-pound batch dryer in a two-step process employing, as a first drying step, either 165° F. (73.9° C.) dry bulb and 150° F. (65.6° C.) wet bulb conditions; or 190° F. (87.8° C.) dry bulb and 180° F. (82.2° C.) wet bulb, as specified.

Solids loss and weight gain were measured according to the following method.

350 grams of room temperature tap water were weighed into a 2 liter glass beaker. 170.0 grams of macaroni was added and mixed. The mixture was placed in a microwave oven at 700 watts or above and cooked for 4 minutes at full power. The contents were then stirred and cooked at full power for an additional 4 minutes to make the total cooking time 8 minutes. The cooked macaroni was then taken out of the beaker and stirred with 500 ml of water for 15 seconds. The mixture was allowed to stand for 10 seconds, stirred again quickly, then drained through a tared colander into a tared vessel, and allowed to continue draining for one minute. The drained water and cooked pasta were each weighed, and the percent solids lost in the drained water determined. The percent cooking loss and percent weight gain were determined as follows:

$$\% \text{ weight gain} = \frac{(\text{weight of cooked pasta} - 170)}{170} \times 100$$

$$\% \text{ cooking (starch) loss} = \frac{\% \text{ solids} \times \text{weight of drained water}}{170}$$

The resulting solids (starch) loss into the drain water; weight gain of the pasta; and texture are given in Table 1 for various samples subjected to microwave cooking.

TABLE 1

Cooking Losses, Weight Gain and Texture of Pasta Prepared by Microwave Cooking in Accordance with the Present Invention

| Example No. | Drying temperature | Moisture Content | 200 ppm Sodium Bisulfite Added | % Solids in Drain Water | % Weight Gain | Texture* |
|---|---|---|---|---|---|---|
| 3 | 165° F. (73.9° C.) | 30% | No | 5.28 | 260 | normal but soft |
| 4 | 165° F. | 24% | Yes | 3.52 | 257 | very good |
| 5 | 165° F. | 24% | No | 6.50 | 266 | very good |
| 6 | 190° F. (87.8° C.) | 30% | No | 3.08 | 259 | normal, firm |
| 7 | 190° F. | 24% | Yes | 2.76 | 260 | normal, firm |
| 8 | 190° F. | 24% | No | 3.60 | 254 | normal |

*determined by a select panel

COLOR RETENTION PROPERTIES OF PASTA PREPARED ACCORDING TO THE PRESENT INVENTION

EXAMPLES 9-62

Semolina elbow macaroni was prepared and dried according to the process of Examples 3-8. Fifty-four samples were subjected to varying conditions of percent extrusion moisture; drying time; drying temperature; relative humidity during drying; and presence or absence of 200 ppm of sodium bisulfite reducing agent.

The effect of these conditions on color retention of pasta was measured according to the American Association of Cereal Chemists (AACC) method #14-50. The results are recorded in Table 2.

TABLE 2

Color Retention of Pasta Prepared in Accordance With the Present Invention

| Example No. | % Moisture of Pasta Dough | % Moisture in Extruded Pasta | 200 ppm Sodium Bisulfite Added | Drying Conditions* | Drying Time, (Minutes) | % Color Retained |
|---|---|---|---|---|---|---|
| 9 | 30 | 27.30 | No | LO | 0 | 57.2 |
| 10 | 30 | 24.56 | No | LO | 50 | 41.6 |
| 11 | 30 | 19.33 | No | LO | 110 | 36.0 |
| 12 | 30 | 15.80 | No | LO | 170 | 32.4 |
| 13 | 30 | 12.13 | No | LO | 230 | 31.7 |
| 14 | 30 | 10.05 | No | LO | 290 | 27.7 |
| 15 | 30 | 29.12 | No | MED | 0 | 57.2 |
| 16 | 30 | 14.07 | No | MED | 112 | 21.9 |
| 17 | 30 | 11.90 | No | MED | 172 | 20.3 |
| 18 | 30 | 9.73 | No | MED | 232 | 16.3 |
| 19 | 30 | 9.28 | No | MED | 292 | 17.0 |
| 20 | 30 | 8.26 | No | MED | 352 | 16.0 |
| 21 | 30 | 28.30 | No | HI | 0 | 57.2 |
| 22 | 30 | 26.18 | No | HI | 60 | 59.0 |
| 23 | 30 | 21.87 | No | HI | 120 | 50.0 |
| 24 | 30 | 16.09 | No | HI | 180 | 36.2 |

TABLE 2-continued

Color Retention of Pasta Prepared in Accordance With the Present Invention

| Example No. | % Moisture of Pasta Dough | % Moisture in Extruded Pasta | 200 ppm Sodium Bisulfite Added | Drying Conditions* | Drying Time, (Minutes) | % Color Retained |
|---|---|---|---|---|---|---|
| 25 | 30 | 12.25 | No | HI | 240 | 20.6 |
| 26 | 30 | 10.35 | No | HI | 300 | 19.3 |
| 27 | 24 | 22.12 | Yes | LO | 0 | 64.2 |
| 28 | 24 | 21.01 | Yes | LO | 38 | 51.7 |
| 29 | 24 | 17.00 | Yes | LO | 98 | 41.8 |
| 30 | 24 | 13.97 | Yes | LO | 158 | 37.1 |
| 31 | 24 | 12.66 | Yes | LO | 218 | 35.2 |
| 32 | 24 | 10.28 | Yes | LO | 278 | 35.6 |
| 33 | 24 | 22.82 | Yes | MED | 0 | 64.2 |
| 34 | 24 | 16.48 | Yes | MED | 75 | 36.6 |
| 35 | 24 | 12.95 | Yes | MED | 135 | 34.9 |
| 36 | 24 | 11.51 | Yes | MED | 195 | 27.6 |
| 37 | 24 | 10.00 | Yes | MED | 255 | 31.1 |
| 38 | 24 | 9.43 | Yes | MED | 315 | 29.0 |
| 39 | 24 | 22.90 | Yes | HI | 0 | 64.2 |
| 40 | 24 | 20.18 | Yes | HI | 45 | 59.2 |
| 41 | 24 | 16.69 | Yes | HI | 105 | 51.7 |
| 42 | 24 | 11.74 | Yes | HI | 165 | 33.0 |
| 43 | 24 | 8.70 | Yes | HI | 225 | 23.7 |
| 44 | 24 | 7.20 | Yes | HI | 285 | 23.1 |
| 45 | 24 | 22.11 | No | LO | 0 | 86.8 |
| 46 | 24 | 20.83 | No | LO | 25 | 79.6 |
| 47 | 24 | 16.69 | No | LO | 85 | 76.2 |
| 48 | 24 | 11.93 | No | LO | 145 | 73.1 |
| 49 | 24 | 10.16 | No | LO | 205 | 70.8 |
| 50 | 24 | 9.50 | No | LO | 265 | 70.4 |
| 51 | 24 | 23.51 | No | MED | 0 | 86.8 |
| 52 | 24 | 19.22 | No | MED | 56 | 54.3 |
| 53 | 24 | 12.49 | No | MED | 116 | 39.9 |
| 54 | 24 | 9.49 | No | MED | 176 | 44.7 |
| 55 | 24 | 9.58 | No | MED | 236 | 40.7 |
| 56 | 24 | 8.17 | No | MED | 296 | 40.8 |
| 57 | 24 | 23.40 | No | HI | 0 | 86.8 |
| 58 | 24 | 21.85 | No | HI | 25 | 75.2 |
| 59 | 24 | 16.41 | No | HI | 85 | 67.0 |
| 60 | 24 | 9.74 | No | HI | 145 | 52.1 |
| 61 | 24 | 8.49 | No | HI | 205 | 48.3 |
| 62 | 24 | 6.82 | No | HI | 265 | 48.3 |

*Key to Drying Conditions
LO = 114° F. (45.6° C.) dry bulb;
98° F. (36.7° C.) wet bulb;
56% relative humidity.
MED = 165° F. (73.9° C.) dry bulb;
150° F. (65.6° C.) wet bulb;
68% relative humidity.
HI = 190° F. (87.8° C.) dry bulb;
180° F. (82.2° C.) wet bulb;
80% relative humidity.

THIAMINE AND RIBOFLAVIN LOSSES IN PASTA PREPARED ACCORDING TO THE PRESENT INVENTION

EXAMPLES 63-71

Elbow macaroni prepared according to the procedure discussed in Examples 3-8 was cooked by conventional heating using excess boiling water and assayed to determine loss of thiamine and riboflavin in pasta using Association of Official Analytical Chemists (AOAC) method #44-031. Results are given in Table 3 which follows.

TABLE 3

Thiamine and Riboflavin Losses in Pasta Prepared According to the Present Invention

| Example No. | Drying Conditions* | % Moisture Content | 200 ppm Sodium Bisulfite Added | THIAMINE Initial mg/100 g | THIAMINE Final mg/100 g | THIAMINE % Loss | RIBOFLAVIN Initial mg/100 g | RIBOFLAVIN Final mg/100 g | RIBOFLAVIN % Loss |
|---|---|---|---|---|---|---|---|---|---|
| 63 | LO | 30 | No | 1.22 | 1.02 | 16.39 | 0.61 | 0.36 | 40.98 |
| 64 | LO | 24 | Yes | 1.11 | 0.91 | 18.01 | 0.52 | 0.36 | 30.77 |
| 65 | LO | 24 | No | 1.08 | 0.90 | 16.67 | 0.51 | 0.37 | 27.45 |
| 66 | MED | 30 | No | 1.22 | 0.84 | 31.15 | 0.61 | 0.39 | 36.06 |
| 67 | MED | 24 | Yes | 1.11 | 0.80 | 38.92 | 0.52 | 0.34 | 34.61 |
| 68 | MED | 24 | No | 1.08 | 0.89 | 17.59 | 0.51 | 0.37 | 27.45 |
| 69 | HI | 30 | No | 1.22 | 0.95 | 22.13 | 0.61 | 0.44 | 27.89 |
| 70 | HI | 24 | Yes | 1.11 | 0.88 | 20.72 | 0.52 | 0.41 | 21.15 |
| 71 | HI | 24 | No | 1.08 | 0.93 | 13.89 | 0.51 | 0.44 | 13.73 |

*Key to Drying Conditions
LO = 114° F. (45.6° C.) dry bulb;
98° F. (36.7° C.) wet bulb;
56% relative humidity.
MED = 165° F. (73.9° C.) dry bulb;
150° F. (65.6° C.) wet bulb;
68% relative humidity.
HI = 190° F. (87.8° C.) dry bulb;
180° F. (82.2° C.) wet bulb;
80% relative humidity.

MAILLARD REACTION PRODUCTS FORMATION IN PASTA PREPARED ACCORDING TO THE PRESENT INVENTION

EXAMPLES 72-80

Elbow macaroni prepared according to the process of the above Examples was tested, in its dried, uncooked state to determine discoloration (browning) as a measure of the extent of Maillard reaction products formation, a higher value being indicative of more advanced reaction. The measurement was made by forming an extract in cold, distilled water and measuring absorbance (O.D.) at 260 nm with a spectrophotometer. Results are given in Table 4.

TABLE 4

Maillard Reaction Products Formation in Pasta Prepared According to the Present Invention

| Example No. | Drying Temp. | % Moisture Content | 200 ppm Sodium Bisulfite Added | O.D. at 260 nm (baseline corrected) |
| --- | --- | --- | --- | --- |
| 72 | 114° F. (45.6° C.) | 30 | No | 0.195 |
| 73 | 114° F. | 24 | Yes | 0.192 |
| 74 | 114° F. | 24 | No | 0.102 |
| 75 | 165° F. (73.9° C.) | 30 | No | 0.480 |
| 76 | 165° F. | 24 | Yes | 0.072 |
| 77 | 165° F. | 24 | No | 0.060 |
| 78 | 190° F. (87.8° C.) | 30 | No | 0.657 |
| 79 | 190° F. | 24 | Yes | 0.131 |
| 80 | 190° F. | 24 | No | 0.197 |

COOKING INSTRUCTIONS FOR A FAST-COOKING PASTA PRODUCT

EXAMPLE 81

A pasta product may be prepared in accordance with this invention by following the procedure set forth below.

A pot containing 3 quarts of tap water is placed in a refrigerator. A mesh polyethylene bag containing 4 ounces (about 114 grams) of uncooked pasta is dropped into the water and allowed to soak overnight in the water.

The next day, a large pot of 5 quarts of tap water is brought to a rolling boil over a conventional stovetop burner. Optional salt and/or butter may be added to the boiling water. The bag of soaked pasta is dropped into the boiling water. A fork or ladle is used to occasionally swirl the bag in the water to separate its contents.

After 1 to 1½ minutes, the bag is retrieved from the water and cut open with scissors. The cooked pasta contained therein is emptied onto a serving plate, optionally mixed with sauce or other flavoring and eaten.

COOKING INSTRUCTIONS FOR THE MICROWAVE COOKABLE PASTA PRODUCT OF THE INVENTION

EXAMPLE 82

The microwave cookable pasta product of the present invention may be prepared by following the procedure set forth below.

One cup of tap water is added to a microwavable single-serving paper container containing about 3 to 4 ounces (about 85 to about 114 grams) of uncooked pasta. The water and pasta are mixed and allowed to sit for 10 seconds. The mixture is placed in a microwave oven, on high power, covered, for 6 minutes.

The container is removed from the oven, the contents stirred, and eaten directly from the container.

CONCLUSION

There has thus been discovered a novel process for preparing a fast-cooking pasta product. The pasta is surprisingly stable to starch leaching upon soaking in cold water, and to loss of vitamins, color change, and undesirable texture changes as often resulted in the prior art.

The key to the invention is a high temperature preparation step of the uncooked pasta. It has been found that such treatment, i.e., at a temperature in excess of about 180° F. (82.2° C.), results in denaturation of gluten, the protein component of semolina flour. This denaturation results in an encapsulation of starch granules and other water soluble components, thus preventing their movement into the surrounding water. The result is a greatly enhanced structural integrity of the pasta, such that it is capable of withstanding contact with cold water and thus may be hydrated in cold water without cooking. The net result is a pasta product which is fully hydrated and thus may be cooked in a greatly reduced time period, i.e., about 1 to 2 minutes. Furthermore, the high temperature treatment results in pasteurization of the product and denaturation of enzymes which result in discoloration of the dry pasta, thus allowing for enhanced shelf life. Alternatively, fast-cooking pasta may be prepared using a less high temperature preparation step. For example, if pasta containing a low temperature coagulatable material and a sulfhydryl reducing agent is heated even to below 165° F. (73.9° C.), and aged for 3 to 12 months, it will exhibit the desirable characteristics of the present invention.

EXAMPLES 83-92

Pasta Products Made With Egg White Solids But With No Sulfhydryl Reducing Agent

In general, the following steps were used in Examples 83-92 to make microwavable, flavored pasta products using egg white solids but no sulfhydryl reducing agent.

The egg whites were mixed in water using a high speed, high shear mixer. The flavors and color (if required) were mixed in the solution until uniform. The solution was then added slowly to semolina flour in a paddle type Hobart mixer and mixed for six minutes to make a dough. A batch of this dough was placed in the former vessel of an extruder under the following conditions: barrel temperature: 120° F. (48.9° C.), vacuum: 10-25 inches; amperage: 5-10; and back pressure: 1800-2700 psi. Using a standard elbow die, the product was cut about 15-20 mm in length, with a 5 mm diameter and a 0.7 mm wall thickness. Samples were collected on screen trays and dried in a laboratory dryer for about 6-8 hours with 165° F. (73.9° C.) dry bulb and 150° F. (65.6° C.) wet bulb temperatures at about 70% relative humidity. This produced a finished product in the 6-11% moisture range.

The following table reports the ingredients and amounts used in Examples 83-92. In all of the examples and Tables, "T.S." is the abbreviation for total solids, "HVP" is the abbreviation for hydrolyzed vegetable protein, "BHA" is the abbreviation for butylated hydroxyanisole, "GMS" is the abbreviation for glycerol monostearate, "MSG" is the abbreviation for monosodium glutamate, and "ribotide" is a mixture of disodium inosinate and disodium guanylate.

TABLE I

| | Weight in Grams | | | |
| --- | --- | --- | --- | --- |
| Example (% T.S.) | 83 | 84 | 85 | 86 |
| Semolina (87) | 1910.00 | 1870.00 | 10,000.00 | 1880.00 |
| Egg White | 30.00 | 30.00 | 160.00 | 30.00 |

TABLE I-continued

| Weight in Grams | | | | |
|---|---|---|---|---|
| Solids | | | | |
| Water | 550.00 | 490.00 | 2200.00 | 545.00 |
| Cheese Powder | 30.00 | 40.00 | — | — |
| Cheese Paste (62) | 30.00 | 60.00 | 345.00 | — |
| Beef Extract (80) | — | — | — | 76.00 |
| Salt | — | 25.00 | — | — |
| MSG | — | 2.00 | — | — |
| Onion Powder | — | — | — | 10.00 |
| Cheese (70) | — | — | 475.00 | — |
| TOTAL | 2550.00 | 2517.00 | 13,180.00 | 2541.00 |

| Example (% T.S.) | 87 | 88 | 89 | 90 |
|---|---|---|---|---|
| Semolina (87) | 3940.00 | 10,000.00 | 10,000.00 | 3960.00 |
| Egg White Solids | 60.00 | 151.75 | 151.75 | 90.00 |
| Water | 811.11 | 2291.11 | 2291.11 | 720.00 |
| Cheese Paste (62) | — | — | — | 60.00 |
| Beef Extract (80) | 185.15 | — | — | — |
| Beef Tallow | 46.37 | — | — | — |
| Onion Powder | 26.78 | 8.40 | 8.40 | 19.98 |
| HVP | 17.57 | — | — | — |
| Chicken Fat | — | 167.78 | 167.78 | — |
| Chicken Powder | — | 201.32 | 201.32 | — |
| Lecithin | — | 5.05 | 5.05 | — |
| Oleoresins | — | 11.40 | 11.40 | 0.45 |
| Tomato Paste (45) | — | — | — | 399.96 |
| Hydrogenated Soy Oil | — | — | — | 59.93 |
| Garlic Powder | — | — | — | 2.00 |
| BHA | — | — | 0.07 | — |
| TOTAL | 5086.98 | 12,836.81 | 12,836.88 | 5312.32 |

| Example (% T.S.) | 91 | 92 |
|---|---|---|
| Semolina (87) | 6000.00 | 6000.00 |
| Egg White Solids | 190.00 | 190.00 |
| Water | 880.51 | 1061.23 |
| Cheese Powder | — | — |
| Cheese Paste (62) | 100.00 | — |
| Onion Powder | 50.00 | 11.25 |
| Chicken Fat | — | 81.76 |
| Chicken Powder | — | 130.82 |
| Lecithin | — | 6.81 |
| Oleoresins | 1.04 | 13.79 |
| Tomato Paste (45) | 480.00 | — |
| Garlic Powder | 5.00 | — |
| Ribotide | 3.00 | 3.00 |
| Color | 0.05 | — |
| GMS | 180.00 | 60.00 |
| TOTAL | 7889.60 | 7558.66 |

The pasta products made from the above-described pasta doughs containing egg white solids as an added low temperature-coagulatable protein (Examples 83-92) were microwave-cookable and retained their respective flavors following cooking.

EXAMPLES 93-98

Pasta Products Made With Egg Yolk Solids but with no Sulfhydryl Reducing Agent

In general, the same steps described above for Examples 83-92 are also used in Examples 93-98, however, egg yolk solids are used in place of the egg white solids as the added low temperature-coagulatable protein.

The following table reports the ingredients and amounts used in Examples 93-98.

TABLE II

| Weight in Grams | | | |
|---|---|---|---|
| Example (% T.S.) | 93 | 94 | 95 |
| Semolina Flour (86.6) | — | 5000.00 | 5000.00 |
| Semolina (86.4) | 5000.00 | — | — |
| Chicken Flavor (82.4) | — | 262.00 | — |
| Beef Flavor (80.0) | — | — | 235.00 |
| Alfredo Flavor (60.0) | — | — | — |
| Cheese Flavor (60.0) | — | — | — |
| Cysteine | — | — | — |
| Egg Yolk Solids | 100.00 | 100.00 | 100.00 |
| Water | 1400.00 | 1470.17 | 1456.18 |
| Tomato Paste (31.0) | — | — | — |
| Cheese Powder | — | — | — |
| Jalapeno Puree (10.0) | — | — | — |
| Butter Flavor | — | — | — |
| TOTAL | 6500.00 | 6832.17 | 6791.18 |

| Example (% T.S.) | 96 | 97 | 98 |
|---|---|---|---|
| Semolina Flour (86.6) | 5000.00 | 5000.00 | — |
| Semolina (86.4) | — | — | 5000.00 |
| Chicken Flavor (82.4) | — | — | — |
| Beef Flavor (80.0) | — | — | — |
| Alfredo Flavor (60.0) | 462.00 | — | — |
| Cheese Flavor (60.0) | — | 291.67 | — |
| Cysteine | — | — | — |
| Egg Yolk Solids | 100.00 | 100.00 | 200.00 |
| Water | 1360.35 | 1175.88 | 1257.14 |
| Tomato Paste (31.0) | — | 166.67 | — |
| Cheese Powder | — | 28.33 | — |
| Jalapeno Puree (10.0) | — | 150.00 | — |
| Butter Flavor | — | 1.66 | — |
| TOTAL | 6922.35 | 6914.21 | 6457.14 |

The pasta products made from the above-described pasta doughs containing egg yolk solids as an added low temperature-coagulatable protein (Examples 93-98) were microwave-cookable, and retained their respective flavors following cooking.

EXAMPLES 99-106

Pasta Products Made with Sulfhydryl Reducing Agents

Examples 99-106 demonstrate the use of sulfhydryl reducing agents in microwavable, flavored pasta products which do not contain egg white solids. In general, the following steps were followed to produce these microwavable, flavored pasta products.

The sulfhydryl reducing agents were dry mixed with semolina flour in a Hobart vertical cutter mixer. All flavor ingredients were added to water and mixed until uniform. The mixture of flavor ingredients and water was added to semolina and reducing agent mixture, and mixed one minute in a vertical cutter mixer. The batch was placed in the former vessel of an extruder under the same conditions as in Examples 83-92, but with a barrel temperature of 140° F. (60° C.) and no vacuum. Samples were collected on screen trays and dried in a laboratory dryer for about 6-8 hours with 165° F. (73.9° C.) dry bulb and 150° F. (65.6° C.) wet bulb temperatures at about 65% relative humidity. This produced a finished product in the 6-11% moisture range.

The following table reports the ingredients and their amounts used in Examples 99-106:

TABLE III

| Weight in Grams | | | | |
|---|---|---|---|---|
| Example (% T.S.) | 99 | 100 | 101 | 102 |
| Semolina (87) | 6000.00 | 6000.00 | 6000.00 | 6000.00 |
| Water | 1064.67 | 867.13 | 764.00 | 461.63 |
| Cheese Paste (62) | — | — | 410.00 | 132.00 |

TABLE III-continued

| Weight in Grams | | | | |
|---|---|---|---|---|
| Beef Extract (80) | — | 205.90 | — | — |
| Beef Tallow | — | 5.04 | — | — |
| Onion Powder | 12.37 | 2.90 | — | — |
| HVP | — | — | 1.91 | — |
| Chicken Fat | 89.94 | — | — | — |
| Chicken Powder | 143.90 | — | — | — |
| Lecithin | 7.49 | — | — | — |
| Oleoresins | 15.17 | — | — | — |
| Tomato Paste (45) | — | — | — | 300.00 |
| Ribotide | 2.00 | — | — | — |
| Color | — | 50.00 | — | — |
| $Na_2S_2O_5$ | 0.60 | 0.90 | 0.90 | 0.90 |
| Cysteine | 3.00 | 3.00 | 3.00 | 3.00 |
| Lactic Acid | — | — | 10.00 | — |
| Yeast, Autolyzed | — | 30.00 | — | — |
| Butter Flavor | — | — | 1.00 | 0.05 |
| Pureed Peppers (10) | — | — | — | 228.00 |
| TOTAL | 7339.14 | 7164.87 | 7190.81 | 7125.58 |

| Example (% T.S.) | 103 | 104 | 105 | 106 |
|---|---|---|---|---|
| Semolina (87) | 6000.00 | 6000.00 | — | — |
| Water | 575.92 | 800.00 | 611.11 | 836.00 |
| Cheese Paste (62) | — | — | 410.00 | 410.00 |
| MSG | — | 5.00 | — | — |
| Beef Extract (80) | 64.34 | — | — | — |
| Beef Tallow | 16.13 | — | — | — |
| Onion Powder | 9.27 | — | — | — |
| HVP | 6.13 | — | — | — |
| Garlic Powder | 0.20 | 10.00 | — | — |
| Mushroom | 50.00 | — | — | — |
| $Na_2S_2O_5$ | 0.90 | 1.00 | 1.20 | 1.20 |
| Cysteine | 3.00 | 3.00 | 3.00 | 3.00 |
| Lactic Acid (85) | 6.00 | — | 10.00 | 10.00 |
| Yeast, Autolyzed | 30.00 | — | — | — |
| GMS | — | — | 22.50 | 22.50 |
| Butter Flavor | 0.05 | 2.00 | 1.00 | 1.00 |
| Spices | 5.00 | — | — | — |
| Sour Cream (19) | 505.00 | — | — | — |
| Cheese (70) | — | 450.00 | — | — |
| $TiO_2$ | — | 6.00 | — | — |
| Spring Wheat Flour (87) | — | — | 6000.00 | — |
| Durum Wheat Flour (87) | — | — | — | 6000.00 |
| TOTAL | 7271.94 | 7277.00 | 7058.81 | 7283.70 |

The pasta products made from the above-identified pasta doughs containing cysteine and sodium metabisulfite as added sulfhydryl reducing agents (Examples 99-100) were microwave-cookable, and retained their respective flavors following cooking.

EXAMPLES 107-110

Pasta Products Made With Egg White Solids and a Sulfhydryl Reducing Agent

The pasta products of Examples 107-110 are prepared in a manner similar to that used in Examples 83-92, however, the added sulfhydryl reducing agent is dry mixed with the semolina flour before the egg white solution is added thereto.

The following table reports the ingredients and amounts used in Examples 107-110:

TABLE IV

| Weight in Grams | | | | |
|---|---|---|---|---|
| Example (% T.S.) | 107 | 108 | 109 | 110 |
| Semolina Flour (87) | 5000.00 | 5000.00 | 6000.00 | 5000.00 |
| Semolina (86.4) | — | — | — | — |
| Chicken Flavor (82.4) | 262.00 | — | — | — |
| Beef Flavor (80.0) | — | 235.00 | — | — |
| Alfredo Flavor (60.0) | — | — | 555.00 | — |
| Cheese Flavor (60.0) | — | — | — | 291.67 |
| Cysteine | 2.50 | 2.50 | 3.00 | 2.50 |
| Egg White Solids | 75.00 | 75.00 | 60.00 | 75.00 |
| Water | 1459.58 | 1445.59 | 1605.53 | 1165.29 |
| Tomato Paste (31.0) | — | — | — | 166.67 |
| Cheese Powder | — | — | — | 28.33 |
| Jalapeno Puree (10.0) | — | — | — | 150.00 |
| Butter Flavor | — | — | — | 1.66 |
| TOTAL | 6799.08 | 6758.09 | 8223.53 | 6881.12 |

The pasta products made from the above-described pasta doughs containing egg white solids as an added low temperature-coagulatable protein and cysteine as an added sulfhydryl reducing agent (Examples 107-110) are microwave-cookable, and retained their respective flavors following cooking.

EXAMPLES 111-114

High Temperature Drying of Pasta Products

The pasta products of Examples 111-114 were prepared in a manner similar to that used in Examples 99-102 except for the final drying step. In Examples 111-114, the extruded pasta shapes were subjected to a high temperature drying step. The high temperature drying comprises subjecting the extruded pasta product to continuous drying for 75 minutes with 180° F. (82.2° C.) dry bulb and 165° F. (73.9° C.) wet bulb temperatures at 72% relative humidity.

The following table shows the ingredients and their amounts used in Examples 111-114.

TABLE V

| Weight in Grams | | | | |
|---|---|---|---|---|
| Example (% T.S.) | 111 | 112 | 113 | 114 |
| Semolina (87) | 6000.00 | 6000.00 | 6000.00 | 6000.00 |
| Egg White Solids | 80.00 | — | — | — |
| Whey Protein Concentrate | — | 240.00 | 120.00 | — |
| Cysteine | 2.50 | — | 2.50 | 4.43 |
| Cheese Paste (60) | 30.00 | 30.00 | 30.00 | 30.00 |
| Water | 907.11 | 956.84 | 919.74 | 882.45 |
| TOTAL | 7019.61 | 7226.84 | 7072.24 | 6916.88 |

The pasta products made from the above-described pasta doughs which were subjected to a high temperature drying step (Examples 111-114) were microwave-cookable, and retained their cheese flavor following cooking.

EXAMPLES 115-117

Total Solids Loss During Microwave Cooking of the Pasta Product

In Examples 115-117, a comparison was conducted to determine the difference in solids loss during microwave cooking between pasta products subjected to high temperature drying and pasta products subjected to conventional low temperature drying.

Examples 115 and 116 also demonstrate the substantially reduced extrusion pressures achieved when a sulfhydryl reducing agent such as cysteine is included in the pasta dough. The reduced extrusion pressures of Examples 115 and 116 are a drastic contrast to the extrusion pressure of control Example 117. The composition of the pasta dough for Examples 115-117 is presented below in Table VI.

TABLE VI

| (% T.S.) | Weight in Grams Example | | |
|---|---|---|---|
| | 115 | 116 | 117 |
| Semolina (86.7) | 6000.00 | 6000.00 | 6000.00 |
| Cheese Paste (60) | 410.00 | 410.00 | 410.00 |
| Lactic Acid (85) | 8.00 | 8.00 | 8.00 |
| Cysteine | 5.00 | 5.00 | — |
| Natural Flavor | 2.00 | 2.00 | 2.00 |
| Water | 1371.67 | 756.23 | 756.23 |
| TOTAL | 7796.67 | 7181.23 | 7176.23 |
| extrusion pressure | 1200 psi | 1800 psi | 3400 psi |

*Note: Example 117 is a control sample without a sulfhydryl reducing agent.

The procedures used to form the pasta dough and extrude the pasta products of Examples 115-117 are similar to those set forth for Examples 99-106. However, after extrusion the pasta product was split into two parts with part (A) dried on trays for eight hours at 110° F. (43.3° C.) dry bulb and 98° F. (36.7° C.) wet bulb at about 65% relative humidity, and part (B) dried for 75 minutes at 180° F. (82.2° C.) dry bulb and 165° F. (73.9° C.) wet bulb at about 72% relative humidity.

After the products of Examples 115-117 were dried, they were cooked in a microwave oven and the cooking losses of the solids were measured using the following methods:

170 grams of dried pasta were added to a one liter Pyrex beaker with 350 ml tap water at about 70° F. (21.1° C.). The pasta was cooked on highest setting in a Litton Generation II Model 2094 microwave oven (650 watts) for four minutes. At the end of four minutes, the pasta was stirred and again microwaved at the highest setting for an additional four minutes. The pasta was then removed from the oven, 500 ml tap water were added, and the mixture stirred for one minute. The pasta was then drained for 2½ minutes, making sure to save all the drain water. The cooked pasta and the drain water were weighed and recorded, and the drain water submitted for total solids analysis.

The following calculations were then performed in order to determine the percentage of solids loss to the cooking and added water.

$$\frac{\% \text{ Total Solids in the Drain Water}}{100} \times \text{Weight of Water} = \text{Grams Solids Loss} \quad (1)$$

$$\frac{\text{Grams Solids Loss}}{\text{Original Pasta Weight}} \times 100 = \% \text{ Solids Loss} \quad (2)$$

The results of the comparison of solids loss during microwave cooking of pasta products subjected to high temperature drying and pasta products subjected to low temperature drying are presented below in Table VII.

TABLE VII

| Example | % Solids Loss |
|---|---|
| 115 (30% Moisture) | |
| [A] Low Temperature Dried | 5.41 |
| [B] High Temperature Dried | 3.09 |
| 116 (24% Moisture) | |
| [A] Low Temperature Dried | 6.41 |
| [B] High Temperature Dried | 4.30 |
| 117 (24% Moisture) | |
| [A] Low Temperature Dried | 6.80 |
| [B] High Temperature Dried | 4.88 |

EXAMPLE 118

Cooking Instructions for a One-Step Pasta Product

The pasta product of the present invention may be prepared in one step by adding six ounces of the pasta product to two cups of rapidly boiling water, stirring until a full boil returns and then cooking at a low boil until all the water has disappeared (about 5-7 minutes).

EXAMPLE 119

Microwave Instructions for the Inventive One-Step Flavored Inventive Pasta Product The pasta product of this aspect of the present invention may be prepared in a microwave oven by following the procedure set forth below.

1½ cups tap water, one level teaspoon salt, six ounces of pasta and ¼ cup butter were added to a 1½ quart Pyrex bowl. A microwave oven was used to heat the contents of the bowl, on high power, uncovered, for four minutes. The bowl was removed from the oven and the contents stirred. The contents of the bowl were heated for an additional four minutes on high power. The bowl was then removed from the oven, the contents stirred, and served.

EXAMPLES 120-147

Snack Food Products from the Pasta Dough of Examples 83-110

Flavored pasta doughs are prepared according to the descriptions set out in Examples 83-110 above, with the exception that the doughs are not subjected to a drying step following extrusion. Instead, the doughs are extruded directly into a Toastmaster Model N 2115 fryer (a conventional french-fry fryer).

The pasta doughs are fried in hot oil in two shapes for each flavored dough type (undried doughs of Examples 83-110). "Bow ties" (rectangular strips which are pinched at their centers) are sheeted, and spirals (rectangular strips twisted about their longitudinal axis to form a spiral shape) are extruded. The ribbons of pasta dough from which the "bow ties" and spirals are formed are about 0.03 inch thick. Each shape of each type of flavored dough is then subjected to four different frying tests:

| Test No. | Frying Oil Temperature | Frying Time |
| --- | --- | --- |
| 1 | 320° F. (160° C.) | 78-80 seconds |
| 2 | 350° F. (177° C.) | 60-70 seconds |
| 3 | 360° F. (182° C.) | 55-65 seconds |
| 4 | 380° F. (193° C.) | 50-60 seconds |

In general, the products of Test 1 have the lightest color, most near that as extruded. These products also have the hardest texture.

Products of Test 2 have a more golden brown color typical of most conventional snack products. The texture is closer to normal snacks, perhaps a bit harder.

Products of Test 3 have a definite light brown color with more of a toasted flavor. The texture is almost like that of a conventional fried potato chip (commonly referred to as a Saratoga chip).

Products of Test 4 have the darkest brown color with a definite toasted flavor which tends to mask any internal flavor. The texture is the softest and is also like that of a conventional fried potato chip.

CONCLUSION

While the invention has been disclosed by reference to the details of preferred embodiments, the disclosure is intended in an illustrative rather than a limiting sense, as it is contemplated that modifications will readily occur to those skilled in the art, within the spirit of the invention and the scope of the appended claims.

What is claimed is:

1. A process for fast cooking pasta comprising the steps of
   (a) soaking uncooked pasta in water having a temperature of between about 33° F. (0.6° C.) and about 140° F. (60° C.) for a period of time sufficient to hydrate said pasta; and
   (b) cooking the soaked pasta resulting from step (a) by heating it for a period of time shorter than said be needed to cook pasta which had not been previously soaked,
   said uncooked pasta being one which displays a starch loss of less than about 7.0 weight percent when evaluated by cooking 170 grams in 350 grams of water in a microwave oven at 700 watts for eight minutes and then extracting with 500 ml of room temperature water.

2. The process according to claim 1 wherein said period of time in step (b) is between about 1 and about 2 minutes.

3. The process according to claim 1 wherein said cooking step (b) is accomplished by microwave heating.

4. The process according to claim 1 wherein said cooking step (b) is accomplished by immersion in boiling water.

5. The process according to claim 1 wherein said soaking step (a) is performed at a temperature of between about 40° F. (4.4° C.) and about 50° F. (10° C.).

6. The process according to claim 1 wherein said uncooked parts of step (a) is soaked in an individual portion of between about 3 ounces (85.2 grams) and about 4 ounces (113.6 grams).

7. The process according to claim 6 wherein said portion is packaged in a water-permeable container resistant to boiling water.

8. The process according to claim 7 wherein said container is a perforated plastic bag.

9. The process according to claim 1 comprising, prior to said soaking step (a), subjecting said uncooked pasta to temperatures of at least about 180° F. (82.2° C.).

10. The process according to claim 9 wherein said temperatures to which said pasta is subjected prior to said soaking step (a) are provided by a source selected from the group consisting of a drier, a heated drum, a microwave oven, an infrared tunnel, a dielectric heater and superheated steam.

11. The process according to claim 9 wherein said temperatures are provided by a drier.

12. A process according to claim 1 wherein the pasta of step (a) is selected from the group consisting of spaghetti, linguini, elbows, spirals, shells, conchiglioni, ziti, vermicelli, fusilli, fettucine, tortellini, ravioli, manicotti, lasagna, rote, tortiglioni and mixtures thereof.

13. A process according to claim 1 wherein cooked pasta resulting from step (b) retains a natural golden color.

14. A process according to claim 1 wherein said uncooked pasta is made up with added vitamins and at least 50% of vitamins present in said uncooked pasta are retained in said pasta subsequent to said cooking step (b).

15. The process according to claim 1 wherein said uncooked pasta of step (a) is prepared from an alimentary paste comprising,
   (i) between about 67.0% and about 80.0% by weight of said paste of semolina flour, said semolina flour having an inherent moisture content in the range of between about 11% and about 14% by weight,
   (ii) between about 0% and about 2% by weight of glycerol monostearate,
   (iii) between about 0% an about 3.0% by weight of a low temperature coagulatable protein material,
   (iv) between about 0% and about 0.2% by weight of a sulfhydryl reducing agent and
   (v) the remainder water.

16. The process according to claim 15 wherein said low temperature coagulatable protein material (iii) is selected from the group consisting of albumin, whole egg, egg white, egg yolk, whey protein concentrate and mixtures thereof.

17. The process according to claim 16 wherein said protein material (iii) is egg white.

18. The process according to claim 15 wherein said sulfydryl reducing agent (iv) is selected from the group consisting of sodium metabisulfite, cysteine, water soluble cysteine salts, glutathione, and mixtures thereof.

19. The process according to claim 18 wherein said sulfhydryl reducing agent (iv) is 1-cysteine hydrochloride.

20. The process according to claim 1 wherein said uncooked pasta of step (a) is prepared from an alimentary paste comprising
   (i) between about 67.0% and about 80.0% by weight said paste of semolina flour having a moisture content in the range of between about 11% and about 14% by weight,
   (ii) between about 0% and about 2% by weight of glycerol monostearate,
   (iii) between about 0.5% and about 3.0% by weight of a low temperature coagulatable protein material,
   (iv) between about 0% and about 0.2% by weight of a sulfhydryl reducing agent and
   (v) the remainder water.

21. The process according to claim 1 wherein said uncooked pasta of step (a) is prepared from an alimentary paste comprising,
(i) between about 67.0% and about 80.0% by weight said paste of semolina flour having a moisture content in the range of between about 11% and about 14% by weight,
(ii) between about 0% and about 2% by weight of glycerol monostearate,
(iii) between about 0.5% and about 3.0% by weight of a low temperature coagulatable protein material,
(iv) between about 0.005% and about 0.2% by weight of a sulfhydryl reducing agent and
(v) the remainder water.

22. A shelf, stable, microwave cookable, prepackaged pasta product containing uncooked pasta and sauce capable of preparation to a consumable, servable stage by addition thereto of a liquid which comprises water and has a temperature of between about 33° F. (0.6° C.) and about 140° F. (60° C.) and cooking in a microwave oven, said pasta
(a) being prepared from an alimentary paste comprising
(i) between about 0 and 3 weight percent of a low temperature coagulatable protein,
(ii) optionally between 0.005 and 0.2 weight percent of a sulfhydryl reducing agent,
(iii) optionally between about 0.5 and 2 weight percent of glycerol monostearate,
(iv) between about 20 and 30 weight percent moisture, and
(v) the balance of the solids portion of said paste of a glutinous flour,
said paste having been subjected to conditions of extrusion, drying and aging which cause the uncooked pasta to display a starch loss of less than about 7.0 weight percent when evaluated by cooking 170 grams in 350 grams of water in a microwave oven at 700 watts for eight minutes and then extracting with 500 ml of room temperature water.

23. A process for microwave cooking pasta comprising the steps of:
(a) adding a liquid with a temperature between about 33° and 140° F. (0.6° C. and 60° C.) to uncooked pasta, wherein the pasta does not become gummy or mushy, and
(b) exposing the liquid and uncooked pasta to microwave radiation of sufficient power and for a sufficient duration to cook the pasta,
said uncooked pasta being one which displays a starch loss of less than about 7.0 weight percent when evaluated by cooking 170 grams in 350 grams of water in a microwave oven at 700 watts for eight minutes and then extracting with 500 ml of room temperature water.

24. The process of claim 23 wherein the amount liquid added is the minimal amount needed to hydrate the pasta and the liquid is not drained from the pasta, whereby a microwave cookable no-drain pasta food product is prepared.

25. The process of claim 23 wherein the uncooked pasta in step (a) is allowed to soak in the liquid for up to about 10 seconds before the cooking of step (b).

26. The process of claim 23 wherein the uncooked pasta has been previously exposed to a temperature between about 165° and 190° F. for a period sufficient to impart tolerance for exposure to cold water.

27. The process of claim 23 wherein the pasta contains a low temperature coagulatable protein.

28. The process of claim 23 wherein the pasta contains a sulfhydryl reducing agent.

29. The process of claim 23 wherein the pasta contains glycerol monostearate.

30. The process of claim 23 wherein the liquid is selected from the group consisting of water, skim milk, whole milk, broth, soup, or combinations thereof.

31. The process of claim 23 wherein the liquid comprises water.

32. The process of claim 23 wherein the uncooked pasta is combined with a sauce mix.

33. The process of claim 32 wherein the sauce mix comprises a dry, liquid or paste flavorant selected from the group of flavors consisting of butter, cheese, cream, and tomato sauce.

34. The process according to claim 23 wherein said uncooked pasta of step (a) is prepared from an alimentary paste comprising,
(a) between about 67.0% and about 80.0% by weight of said paste of semolina flour having a moisture content in the range of between about 11% and about 14% by weight,
(b) between about 0% and about 2% by weight of glycerol monostearate,
(c) between about 0% and about 3.0% by weight of a low temperature coagulatable protein material,
(d) between about 0% and about 0.2% by weight of a sulfhydryl reducing agent, and
(e) the remainder water.

35. The process according to claim 23 wherein said uncooked pasta of step (a) is prepared from an alimentary paste comprising,
(a) between about 67.0% and about 80.0% by weight of said paste of semolina flour having a moisture content in the range of between about 11% and about 14% by weight,
(b) between about 0% and about 2% by weight of glycerol monostearate,
(c) between about 0.5% and about 3.0% by weight of a low temperature coagulatable protein material,
(d) between about 0% and about 0.2% by weight of a sulfhydryl reducing agent, and
(e) the remainder water.

36. The process according to claim 34 or claim 35 wherein low temperature coagulatable protein material (c) is selected from the group consisting of albumin, whole egg, egg white, egg yolk, whey protein concentrate and mixtures thereof.

37. The process according to claim 36 wherein said protein material (c) is egg white.

38. The process according to claim 23 wherein said uncooked pasta of step (a) is prepared from an alimentary paste comprising,
(a) between about 67.0% and about 80.0% by weight of said paste of semolina flour having a moisture content in the range of between about 11% and about 14% by weight,
(b) between about 0% and about 2% by weight of glycerol monostearate,
(c) between about 0.5% and about 3.0% by weight of a low temperature coagulatable protein material,
(d) between about 0.005% and about 0.2% by weight of a sulfhydryl reducing agent, and
(e) the remainder water.

39. The process according to claim 38 wherein said sulfhydryl reducing agent (d) is selected from the group consisting of sodium metabisulfite, cysteine, water soluble cysteine salts, glutathione, and mixtures thereof.

40. The process according to claim 39 wherein said sulfhydryl reducing agent (d) is 1-cysteine hydrochloride.

41. A shelf stable packaged microwavable pasta food product comprising
(a) a package, bearing indications that its contents may be cooked in a microwave oven by adding a liquid which comprises water and has a temperature between about 33° and 140° F. (10.6° C. and 60° C.) and then placing the mixture in the microwave oven, and
(b) an uncooked pasta prepared from an alimentary paste comprising
(i) between about 0 and 3 weight percent of a low temperature coagulatable protein,
(ii) optionally between 0.005 and 0.2 weight percent of a sulfhydryl reducing agent,
(iii) optionally between about 0.5 and 2 weight percent of glycerol monostearate,
(iv) between about 20 and 30 weight percent moisture, and
(v) the balance of the solids portion of a glutinous flour,
said paste having been subjected to extrusion, drying and aging conditions such that the uncooked pasta displays a starch loss of less than about 7.0 weight percent when evaluated by cooking 170 grams in 350 grams of water in a microwave oven at 700 watts for eight minutes and then extracting with 500 ml of room temperature water.

42. The shelf stable packaged microwavable pasta product of claim 41 wherein said package is of a size and construction suitable for insertion into a microwave oven, this construction involving liquid impervious materials which are able to tolerate the temperatures reached in the microwave cooking of pasta.

43. A shelf stable microwave cookable pasta food product comprising
(a) a container of a size and construction suitable for use in cooking in a microwave oven, said container being liquid impervious and resistant to the temperatures encountered in the microwave cooking of pasta,
(b) uncooked pasta prepared from an alimentary paste comprising
(i) between about 0 and 3 weight percent of a low temperature coagulatable protein,
(ii) optionally between 0.005 and 0.2 weight percent of a sulfhydryl reducing agent,
(iii) optionally between about 0.5 and 2 weight percent of glycerol monostearate,
(iv) between about 20 and 30 weight percent moisture, and
(v) the balance of the solids portion of a glutinous flour,
said paste having been subjected to extrusion, drying and aging conditions such that the uncooked pasta displays a starch loss of less than about 7.0 weight percent when evaluated by cooking 170 grams in 350 grams of water in a microwave oven at 700 watts for eight minutes and then extracting with 500 ml of room temperature water, and
(c) a sauce containing a natural or artificial flavorant.

44. The shelf stable packaged pasta food product of claim 43 wherein the sauce is dehydrated.

45. The shelf stable packaged pasta food product of claim 44 wherein the sauce includes the flavor of cheese, cream, butter or tomato.

46. The shelf stable packaged pasta food product of claim 41 wherein the package bears indicia communicating that its contents may be cooked in a microwave oven by adding a liquid which comprises water and has a temperature between about 33° F. and 140° F. (0.6 C. and 60° C.) and then placing the mixture in the microwave oven.

47. The shelf stable packaged pasta food product of claim 41 or claim 43 wherein the uncooked pasta had been previously exposed to a temperature of at least about 180° F. (82.2° C.) for a period sufficient to impart the low starch loss property.

48. The shelf stable packaged pasta food product of claim 41 or claim 43 wherein the uncooked pasta
(a) was prepared from an alimentary paste which contained between about 0.5 and 3.0 weight percent of a low temperature coagulatable protein material, and
(b) had been previously exposed to a temperature of at least about 165° F. (73.9° C.) for a period sufficient to impart the low starch loss property.

49. The shelf stable packaged pasta food product of claim 41 or claim 43 wherein the uncooked pasta
(a) was prepared from an alimentary paste which contained both
(i) between about 0.5 and 3.0 weight percent of a low temperature coagulatable protein material, and
(ii) between about 0.005 and 0.2 weight percent of a sulfhydryl reducing agent, and
(b) has been aged under ambient conditions after extrusion and drying for a period sufficient to impart the low starch loss property.

50. A shelf stable microwave cookable pasta food product comprising
(a) a package bearing indicia communicating that its contents may be cooked in a microwave oven by adding a liquid which comprises water and has a temperature between about 33° F. and 140° F. (0.6° C. and 60° C.) and then placing the mixture in a microwave oven,
(b) uncooked pasta prepared from an alimentary paste comprising
(i) between about 0 and 3 weight percent of a low temperature coagulatable protein,
(ii) optionally between 0.005 and 0.2 weight percent of a sulfhydryl reducing agent,
(iii) optionally between about 0.5 and 2 weight percent of glycerol monostearate,
(iv) between about 20 and 30 weight percent moisture, and
(v) the balance of the solids portion of a glutinous flour,
said paste having been subjected to extrusion, drying and aging conditions such that the uncooked pasta displays a starch loss of less than about 7.0 weight percent when evaluated by cooking 170 grams in 350 grams of water in a microwave oven at 700 watts for eight minutes and then extracting with 500 ml of room temperature water, and
(c) a sauce which contains a natural or artificial flavorant.

51. The shelf stable microwave cookable pasta food product of claim 50 wherein the flavorant imparts the flavor of cheese, cream, butter or tomato.

52. The shelf stable microwave cookable pasta food product of claim 50 wherein the sauce is dehydrated.

53. The process of claims 1 or 23 wherein said uncooked pasta of step (a) is prepared from an alimentary paste comprising
   (a) between about 0 and 3 weight percent of a low temperature coagulatable protein,
   (b) optionally between 0.005 and 0.2 weight percent of a sulfhydryl reducing agent,
   (c) optionally between about 0.5 and 2 weight percent of glycerol monostearate,
   (d) between about 20 and 30 weight percent of moisture, and
   (e) the balance of the solids portion of a glutinous flour
by extrusion to a pasta shape and drying to a moisture content of between about 10 and 15 weight percent.

54. The process of claim 53 wherein the glutinous flour is primarily derived from durum wheat.

55. The shelf stable packaged pasta food product of claim 41 or claim 43 wherein the glutinous flour is primarily derived from durum wheat.

56. The process of claim 1 or claim 23 wherein the uncooked pasta displays a starch loss of less than about 5 weight percent in the microwave cook and water extraction evaluation test.

57. The shelf stable microwavable cookable pasta food product of claim 41 or claim 43 wherein said uncooked pasta displays a starch loss of less than about 5 weight percent in the microwave cook and water extraction evaluation test.

58. An extruded pasta shape obtained by extruding a pasta dough under conditions which will not cause a substantial degree of gelatinization of the dough, said dough comprising
   (a) between about 70 and 85 percent by weight of wheat flour,
   (b) between about 8 and 23 percent by weight of added moisture,
   (c) between about 0.50 and 2.50 percent by weight of an added low temperature-coagulatable protein, and
   (d) a sufficient amount of an added lipid-based flavoring agent, selected from the group consisting of chicken fat, sour cream, butter, cheese, cheese paste, beef extract, beef tallow and combinations thereof; to cause a pasta product made therefrom to retain such flavor after cooking.

59. The extruded pasta shape of claim 58 wherein said low temperature-coagulatable protein is selected from the group consisting of albumin, whole egg, egg white, egg yolk, soy bean isolate and whey protein concentrate.

60. The extruded pasta shape of claim 58 wherein said cooking is microwave cooking.

61. The extruded pasta shape of claim 58 wherein said cooking is frying.

62. The extruded pasta shape of claim 58 further comprising between about 0.0075% and about 0.075% by weight of at least one added sulfhydryl reducing agent.

63. An extruded pasta shape obtained by extruding a pasta dough under conditions which will not cause a substantial degree of gelatinization of the dough, said dough comprising
   (a) between about 70 and 85 percent by weight of wheat flour,
   (b) between about 8 and 23 percent weight of added moisture,
   (c) between about 0.0075 and 0.075 percent by weight of at least one added sulfhydryl reducing agent, and
   (d) a sufficient amount of an added lipid-based flavoring agent, selected from the group consisting of chicken fat, sour cream, butter, cheese, cheese paste, beef extract, beef tallow and combinations thereof; to cause a pasta product made therefrom to retain such flavor after cooking.

64. The extruded pasta shape of claim 63 wherein said added sulfhydryl reducing agent is selected from the group consisting of sodium metabisulfite, cysteine, water-soluble cysteine salts, glutathione and combinations thereof.

65. The extruded pasta shape of claim 63 wherein said cooking is microwave cooking.

66. The cooked pasta product of claim 63 wherein said cooking is frying.

67. The extruded pasta shape of claim 63 wherein said pasta dough is subjected to high temperature drying at about 180° F. dry bulb, and about 165° F. wet bulb, for about 75 minutes.

68. An extruded pasta shape comprising substantially ungelatinized wheat flour; a lipid-based flavoring agent and an additive selected from the group consisting of a sulfhydryl reducing agent, a low temperature coagulatable protein, and mixtures thereof; wherein the process liquid used to form the pasta dough from which the shape is extruded is not milk.

69. An extruded pasta shape of claim 68, wherein the process liquid comprises water.

70. An extruded pasta shape of claim 68 wherein said lipid-based flavoring agent comprises chicken fat.

71. An extruded pasta shape of claim 68 wherein said lipid-based flavoring agent comprises cheese.

72. An extruded pasta shape of claim 68 wherein said lipid-based flavoring agent comprises cheese paste.

73. An extruded pasta shape of claim 68 wherein said lipid-based flavoring agent comprises beef extract.

74. An extruded pasta shape of claim 68 wherein said lipid-based flavoring agent comprises beef tallow.

75. A process for fast cooking pasta comprising the steps of
   (a) soaking uncooked pasta in water having a temperature of between about 33° F. (0.6° C.) and about 140° F. (60° C.) for a period of time sufficient to hydrate said uncooked pasta, which pasta was prepared from an alimentary paste comprising,
      (i) between about 67.0% and about 80.0% by weight of said paste of semolina flour having an inherent moisture content in the range of between about 11% and about 14% by weight,
      (ii) between about 0% and about 2% by weight of glycerol monostearate,
      (iii) between about 0% an about 3.0% by weight of a low temperature coagulatable protein material,
      (iv) between about 0% and about 0% by weight of a sulfhydryl reducing agent and
      (v) the remainder water; and
   (b) heating the soaked pasta resulting from step (a) to cook said pasta,
said uncooked pasta having previously been subjected to temperatures of at least about 165° F. (73.9° C.) for a sufficient period to display a starch loss of less than about 7.0 weight percent when evaluated by cooking 170 grams in 350 grams of water in a microwave oven at 700 watts for eight minutes and then extracting with 500 ml of room temperature water.

76. A process for fast cooking pasta comprising the steps of
(a) soaking uncooked pasta in water having a temperature of between about 33° F. (0.6° C.) and about 140° F. (60° C.) for a period of time sufficient to hydrate said uncooked pasta, which pasta was prepared from an alimentary paste comprising,
 (i) between about 67.0% and about 80.0% by weight of said paste of semolina flour having a moisture content in the range of between about 11% and about 14% by weight,
 (ii) between about 0% and about 2% by weight of glycerol monostearate,
 (iii) between about 0% an about 3.0% by weight of a low temperature coagulatable protein material,
 (iv) between about 0.005% and about 0.2% by weight of a sulfhydryl reducing agent and
 (v) the remainder water; and
(b) heating the soaked pasta resulting from step (a) to cook said pasta,
said uncooked pasta having been previously aged, prior to said soaking step (a) for a period sufficient to display a starch loss of less than about 7.0 weight percent when evaluated by cooking 170 grams in 350 grams of water in a microwave oven at 700 watts for eight minutes and then extracting with 500 ml of room temperature water.

77. The extruded pasta shape of claim 60 wherein said pasta dough is subjected to high temperature drying at about 180° F. dry bulb, and about 165° F. wet bulb, for about 75 minutes.

* * * * *

UNITED STATES PATENT AND TRADEMARK OFFICE
CERTIFICATE OF CORRECTION

PATENT NO. : 5,063,072
DATED : November 5, 1991
INVENTOR(S) : Stephen R. Gillmore, Carleton G. Merrit, Dhyaneshwar B. Chawan, Edward A. Matuszak and Arnold I. Epstein It is certified that error appears in the above-identified patent and that said Letters Patent is hereby corrected as shown below:

On the Title page, item [75], (Inventors), line 4, after "N.Y.", change the period to a comma, and add: --and Arnold I. Epstein, Washington Township, N.J.-- as an inventor.

Column 29, line 8 after "than" delete "said" and insert therefor --would--.

Column 29 line 2 delete "parts" and insert therefor --pasta--.

Column 30, line 4 after "weight" insert --of--.

Column 31, line 2 delete "-prpared" and insert --prepared--.

Column 31, line 1 after "amount" insert --of--.

Column 37, line 1 delete "microwavable" and insert therefor --microwave--.

Signed and Sealed this

Twenty-fifth Day of May, 1993

Attest:

MICHAEL K. KIRK

Attesting Officer

Acting Commissioner of Patents and Trademarks